(12) United States Patent
Teranishi et al.

(10) Patent No.: US 12,157,116 B2
(45) Date of Patent: Dec. 3, 2024

(54) PLUGGED HONEYCOMB STRUCTURE

(71) Applicant: NGK Insulators, Ltd., Nagoya (JP)

(72) Inventors: Makoto Teranishi, Nagoya (JP); Tadato Ito, Komaki (JP); Ken Itadu, Tajimi (JP); Kana Sakamoto, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 164 days.

(21) Appl. No.: 17/453,356

(22) Filed: Nov. 3, 2021

(65) Prior Publication Data

US 2022/0258148 A1    Aug. 18, 2022

(30) Foreign Application Priority Data

Feb. 12, 2021 (JP) ................................ 2021-020913

(51) Int. Cl.
*B01J 35/56* (2024.01)
*B01D 46/24* (2006.01)
(Continued)

(52) U.S. Cl.
CPC .......... *B01J 35/56* (2024.01); *B01D 46/2429* (2013.01); *B01D 46/24491* (2021.08);
(Continued)

(58) Field of Classification Search
None
See application file for complete search history.

(56) References Cited

U.S. PATENT DOCUMENTS 4,417,908 A    11/1983  Pitcher, Jr.
2012/0317945 A1    12/2012  Miyairi
(Continued)

FOREIGN PATENT DOCUMENTS

CN    110947258 A    4/2020
EP    2324904 B1 *  5/2016    ......... B01D 53/9463
(Continued)

OTHER PUBLICATIONS

German Office Action (Application No. 10 2021 213 201.4) dated Apr. 18, 2023 (with English translation).
(Continued)

*Primary Examiner* — Elizabeth Collister
(74) *Attorney, Agent, or Firm* — BURR PATENT LAW, PLLC

(57) ABSTRACT

A plugged honeycomb structure includes a honeycomb structure body having a porous partition wall disposed to surround a plurality of cells; and a plugging portion disposed at one end of the cells, wherein, in a section orthogonal to the extending direction of the cell, the cells each have a shape that is polygon, and one of the inflow cells and another are adjacent to each other with the partition wall therebetween, and in the section orthogonal to the extending direction of the cell, a total area of the inflow cell is larger than a total area of the outflow cell, a porosity of the partition wall is 38% or more, a thickness of the partition wall is 125 μm or more and 280 μm or less, a cell density of the honeycomb structure body is 31.0 cells/cm$^2$ or more, and an air-permeability resistance of the partition wall is 4.5×10$^7$ Pa·s/m$^2$ or less.

10 Claims, 12 Drawing Sheets

(51) Int. Cl.
   *B01D 53/94* (2006.01)
   *F01N 3/10* (2006.01)
   *F01N 3/20* (2006.01)
   *F01N 3/28* (2006.01)
(52) U.S. Cl.
   CPC ....... *B01D 46/2455* (2013.01); *B01D 46/247* (2013.01); *B01D 46/2474* (2013.01); *B01D 46/2482* (2021.08); *B01D 46/2484* (2021.08); *B01D 46/249* (2021.08); *B01D 46/2492* (2021.08); *B01D 53/9418* (2013.01); *B01D 53/944* (2013.01); *B01D 53/945* (2013.01); *F01N 3/101* (2013.01); *F01N 3/2066* (2013.01); *F01N 3/2803* (2013.01); *B01D 2255/20723* (2013.01); *B01D 2255/50* (2013.01); *B01D 2255/9155* (2013.01); *B01D 2255/9202* (2013.01); *B01D 2255/9205* (2013.01); *F01N 2330/32* (2013.01); *F01N 2370/04* (2013.01)

(56) References Cited

U.S. PATENT DOCUMENTS

| | | |
|---|---|---|
| 2014/0059987 A1 | 3/2014 | Hirakawa et al. |
| 2014/0338296 A1 | 11/2014 | Backhaus-Ricoult et al. |
| 2015/0037220 A1 | 2/2015 | Goto et al. |
| 2017/0282125 A1* | 10/2017 | Izumi .................... F01N 3/0222 |
| 2019/0126186 A1* | 5/2019 | Beall .................... F01N 3/0222 |
| 2020/0030730 A1 | 1/2020 | Goto |
| 2020/0101410 A1 | 4/2020 | Makino et al. |
| 2020/0300138 A1 | 9/2020 | Beall et al. |

FOREIGN PATENT DOCUMENTS

| | | |
|---|---|---|
| JP | S58-196820 A | 11/1983 |
| JP | 2013-000680 A | 1/2013 |
| JP | 2015-029936 A | 2/2015 |
| JP | 6068067 B2 | 1/2017 |
| JP | 2018-058761 A | 4/2018 |
| JP | 2018-143956 A | 9/2018 |
| WO | 2019/104057 A1 | 5/2019 |

OTHER PUBLICATIONS

Chinese Office Action (Application No. 202111234194.8) dated Jun. 5, 2023 (with English translation) (30 pags).

* cited by examiner

PLUGGED HONEYCOMB STRUCTURE

The present application is an application based on JP 2021-020913 filed on Feb. 12, 2021 with Japan Patent Office, the entire contents of which are incorporated herein by reference.

BACKGROUND OF THE INVENTION

Field of the Invention

The present invention relates to a plugged honeycomb structure. More particularly, it relates to a plugged honeycomb structure capable of realizing low pressure loss during its use.

Description of the Related Art

In various industries, internal combustion engines are used as a power source. On the other hand, exhaust gas emitted by the internal combustion engine during the combustion of fuels contains particulate matter such as soot and ashes together with toxic gases such as nitrous oxides. Hereinafter, the particulate matter may be referred to as "PM". The "PM" is an abbreviation for "Particulate Matter". Recently, regulations on removing PM emitted from the diesel engine has become stricter worldwide, as a filter for removing PM, for example, wall flow type filter having a honeycomb structure is used.

As the wall flow type filter, various plugged honeycomb structures having a honeycomb structure body in which a plurality of cells serving as fluid through channels is defined by a porous partition wall, and a plugging portion disposed on one of open end of the plurality of cells, have been proposed (e.g., see Patent Documents 1 to 6). In such a plugged honeycomb structure, for example, inflow cells in which the plugging portion is arranged on the outflow end face side and outflow cells in which the plugging portion is arranged on the inflow end face side are arranged alternately with the partition therebetween, and the porous partition wall serves as a filter for removing PM. In particular, the plugged honeycomb structure as a filter for removing PM emitted from a diesel engine is sometimes referred to as a Diesel Particulate Filter. Also, the plugged honeycomb structure as a filter for removing PM emitted from a gasoline engine is sometimes referred to as a Gasoline Particulate Filter. Hereinafter, the diesel particulate filter is sometimes referred to as "DPF", and the gasoline particulate filter is sometimes referred to as "GPF".

| [Patent Document 1] | JP-A-58-196820 |
| [Patent Document 2] | JP-B-6068067 |
| [Patent Document 3] | JP-A-2015-29936 |
| [Patent Document 4] | JP-A-2018-58761 |
| [Patent Document 5] | JP-A-2018-143956 |
| [Patent Document 6] | JP-A-2013-680 |

SUMMARY OF THE INVENTION

The DPF requires periodic cleaning maintenance because of the deposition of inorganic ash content in the engine oil during long-term operation. Therefore, in the DPF, in order to reduce the maintenance cost, an increase in the deposition capacity of the inorganic ash content (hereinafter, also referred to as "ash capacity") is expected.

In order to increase the ash capacity, for example, it is conceivable to increase the ratio of the inflow cells in the DPF. In such a case, unlike the conventional DPF, it is necessary to arrange the cells in which the inflow cells are adjacent to each other. The conventional DPF described above refers to a DPF having a cell structure in which inflow cells and outflow cells are alternately arranged with a partition wall therebetween.

However, in a DPF having a cell arrangement in which the inflow cells are adjacent to each other, the pressure loss when the particulate matters such as soot or the like is adhered to the DPF (hereinafter, also referred to as the "pressure loss with soot") or the pressure loss when soot or the like is not adhered (the initial pressure loss) may increase. That is, in the cell arrangement in which the inflow cells are adjacent to each other, there is a partition wall defining the inflow cells (hereinafter, also referred to as "IN-IN partition wall"). A DPF in which such a IN-IN partition wall is present has an increased pressure loss with soot as compared with the conventional DPF.

As described above, when the ash capacity is increased in order to reduce pressure loss at the time of deposition of the inorganic ash (hereinafter, also referred to as the "pressure loss at the time of ash deposition"), the pressure loss with soot of the DPF increases, and the pressure loss with soot has a trade-off relation with the pressure loss at the time of ash deposition. Therefore, it is desired to develop a plugged honeycomb structure capable of realizing reduction of pressure loss with soot while increasing the ash capacity.

The present invention has been made in view of the problems with the prior arts described above. The present invention provides a plugged honeycomb structure capable of realizing low pressure loss during its use. In particular, the present invention provides a plugged honeycomb structure capable of realizing lower pressure loss by suppressing an increase in pressure loss with soot caused by PM depositing on the surface of partition wall, while increasing the ash capacity.

According to the present invention, there is provided a plugged honeycomb structure as described below.

[1] A plugged honeycomb structure including: a honeycomb structure body having a porous partition wall disposed so as to surround a plurality of cells serving as a fluid through channel extending from an inflow end face to an outflow end face; and a plugging portion disposed so as to plug end at any one of the inflow end face side or the outflow end face side of the cells, wherein the cells having the plugging portion at ends on the outflow end face side and that are open on the inflow end face side are inflow cells, and the cells having the plugging portion at ends on the inflow end face side and that are open on the outflow end face side are outflow cells, in a section orthogonal to the extending direction of the cell of the honeycomb structure body, the cells each have a shape that is polygon, and have a cell structure in which one of the inflow cells and another of the inflow cells are adjacent to each other with the partition wall therebetween, and, in the section orthogonal to the extending direction of the cell, a total area of the inflow cell is larger than a total area of the outflow cell, a porosity of the partition wall is 38% or more, a thickness of the partition wall is 125 μm or more and 280 μm or less, a cell density of the honeycomb structure body is 31.0 cells/cm$^2$ or more, and an air-permeability resistance of the partition wall is $4.5 \times 10^1$ Pa·s/m$^2$ or less.

[2] The plugged honeycomb structure according to [1], wherein the air-permeability resistance of the partition wall is $4.0 \times 10^1$ Pa·s/m$^2$ or less.

[3] The plugged honeycomb structure according to [1] or [2], wherein, in the section orthogonal to the extending direction of the cell, a shape of one of the inflow cells and a shape of one of the outflow cells are congruent or similar, and,
the ratio of the total number Na of the inflow cells with respect to the total number Nb of the outflow cells is 2 or more.

[4] The plugged honeycomb structure according to any one of [1] to [3], wherein, in the section orthogonal to the extending direction of the cell, the shape of the inflow cell is one type.

[5] The plugged honeycomb structure according to any one of [1] to [4], wherein, in the section orthogonal to the extending direction of the cell, the shape of the inflow cell and the shape of the outflow cell are both hexagonal.

[6] The plugged honeycomb structure according to any one of [1] to [5], wherein, in the section orthogonal to the extending direction of the cell, at least one of the cells has a regular hexagonal shape.

[7] The plugged honeycomb structure according to any one of [1] to [6], wherein the partition wall is loaded with at least one catalyst selected from the group consisting of an oxidation catalyst, a selective catalytic reduction catalyst, and a three-way catalyst.

[8] The plugged honeycomb structure according to [7], wherein the partition wall is loaded with the oxidation catalyst and a loading amount of the oxidation catalyst is 0.1 to 30 g/L.

[9] The plugged honeycomb structure according to [7], wherein the partition wall is loaded with the selective catalytic reduction catalyst and a loading amount of the selective catalytic reduction catalyst is 50 to 130 g/L.

[10] The plugged honeycomb structure according to [7] or [9], wherein the selective catalytic reduction catalyst is a zeolite-type selective catalytic reduction catalyst or a vanadium-type selective catalytic reduction catalyst.

[11] The plugged honeycomb structure according to [7], wherein the partition wall is loaded with the three-way catalyst and a loading amount of the three-way catalyst is 40 to 130 g/L.

The plugged honeycomb structure of the present invention has, in a section orthogonal to the extending direction of the cell of the honeycomb structure body, the cells each have a shape that is polygon, and a cell structure in which one of the inflow cells and another of the inflow cells are adjacent to each other with the partition wall therebetween. The plugged honeycomb structure of the present invention is configured such that a total area of the inflow cells is larger than the total area of the outflow cells in the above section of the honeycomb structure body, while a porosity, a thickness and an air-permeability resistance of the partition wall, and a cell density of the honeycomb structure body are set to a predetermined value.

The plugged honeycomb structure of the present invention configured as described above provides an effect of enabling low pressure loss when used as a filter that traps PM in exhaust gas, compared to the conventional plugged honeycomb structure. In particular, the plugged honeycomb structure of the present invention has a remarkable effect of suppressing an increase in the pressure loss with soot due to the deposition of PM on the surfaces of the partition wall while increasing the ash capacity, to realize a lower pressure loss.

DESCRIPTION OF THE PREFERRED EMBODIMENTS

Hereinafter, embodiments of the present invention will be described. However, the present invention is not limited to the following embodiment. Therefore, it should be understood that changes, improvements, and the like may be appropriately made to the following embodiments based on ordinary knowledge of a skill in art without departing from the spirit of the present invention.

(1) Plugged Honeycomb Structure (First Embodiment)

Figure 1:
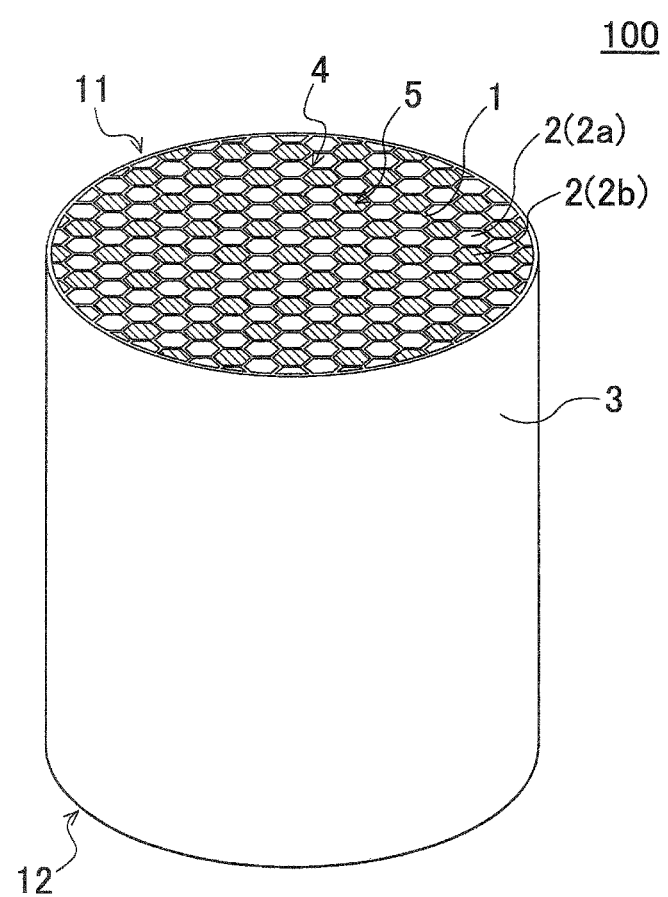
FIG. 1 is a perspective view schematically showing a first embodiment of a plugged honeycomb structure of the present invention as viewed from an inflow end face side.
Figure 2:
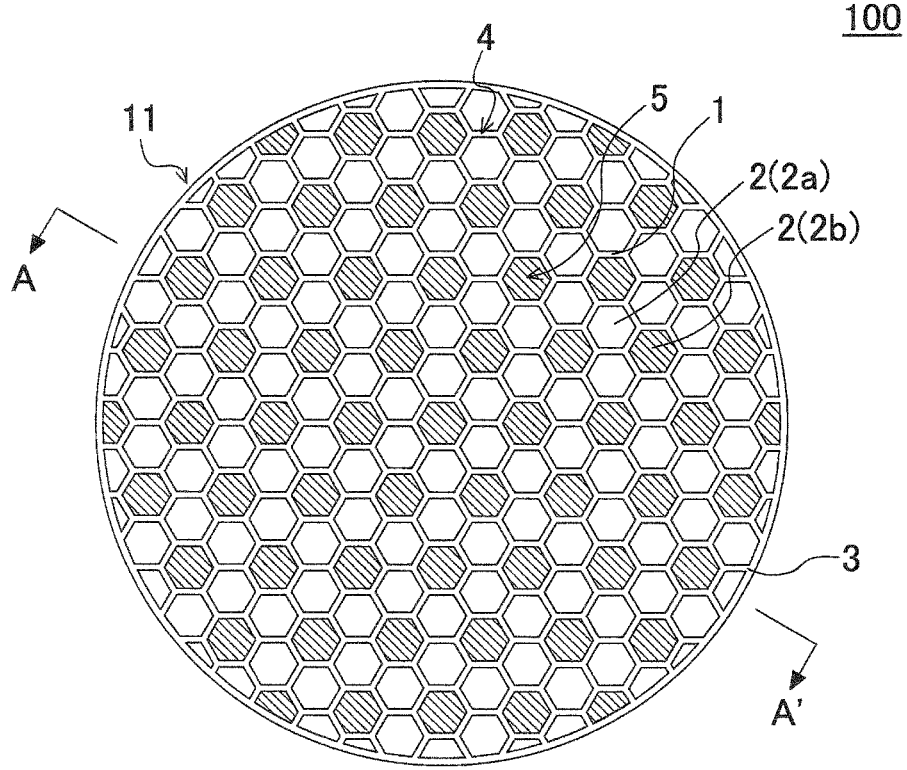
FIG. 2 is a plan view schematically showing the inflow end face of the plugged honeycomb structure shown in FIG. 1.
Figure 3:
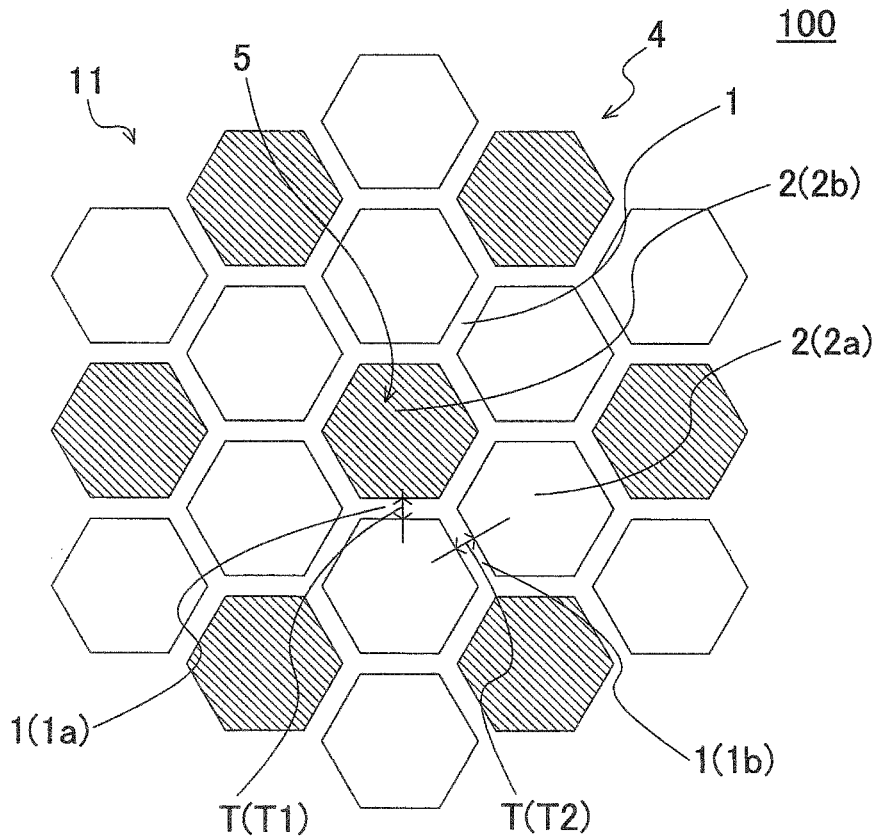
FIG. 3 is an enlarged plan view in which a portion of the inflow end face shown in FIG. 2 is enlarged.
Figure 4:
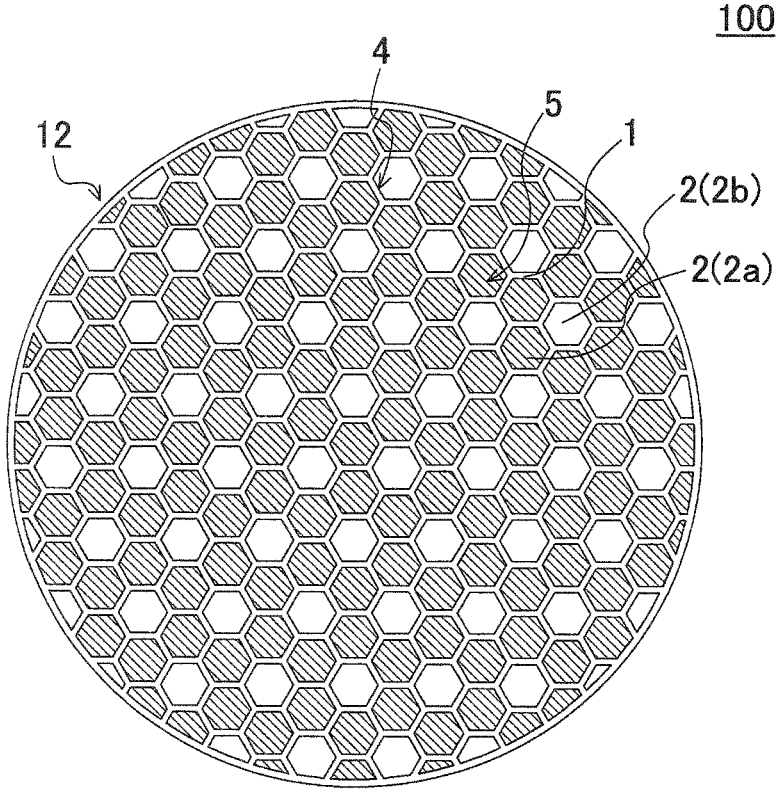
FIG. 4 is a plan view schematically showing an outflow end face of the plugged honeycomb structure shown in FIG. 1.
Figure 5:
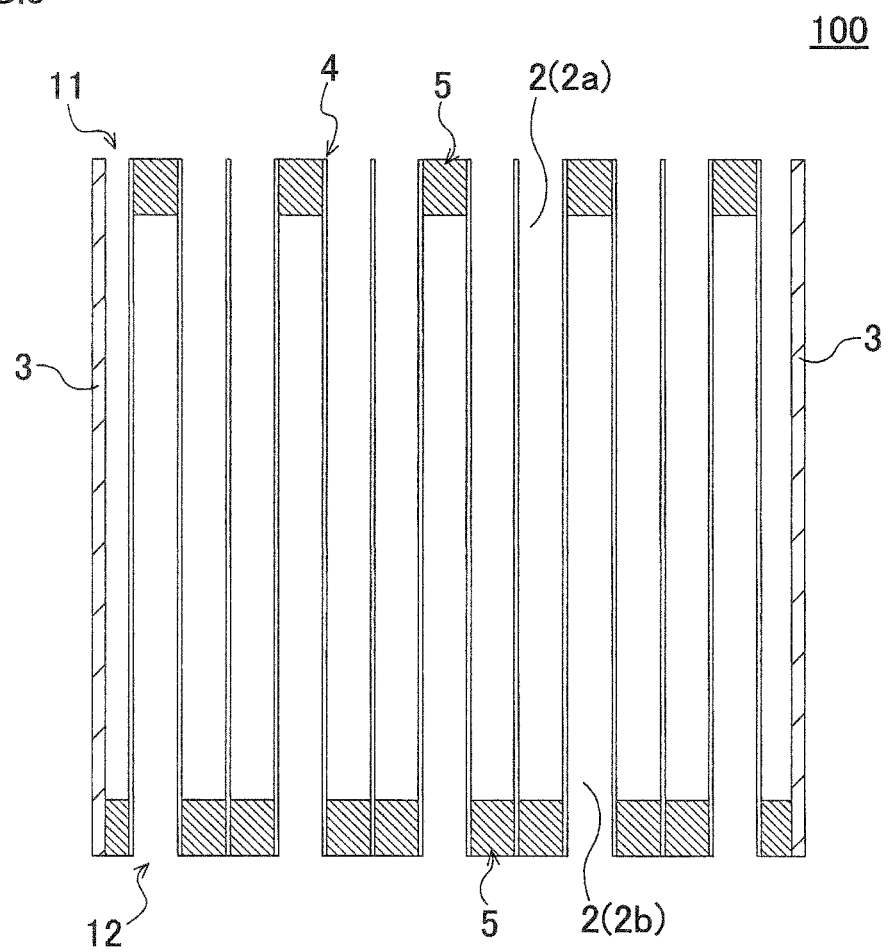
FIG. 5 is a sectional view schematically showing the section taken along the line A-A' of FIG. 2.

Referring to FIGS. 1 to 5, the plugged honeycomb structure 100 of the first embodiment will be described. FIG. 1 is a perspective view schematically showing a first embodiment of the plugged honeycomb structure of the present invention as viewed from the inflow end face side. FIG. 2 is a plan view schematically showing the inflow end face of the plugged honeycomb structure shown in FIG. 1. FIG. 3 is an enlarged plan view in which a portion of the inflow end face shown in FIG. 2 is enlarged. FIG. 4 is a plan view schematically showing the outflow end face of the plugged honeycomb structure shown in FIG. 1. FIG. 5 is a sectional view schematically showing A-A' section of FIG. 2.

The plugged honeycomb structure 100 is provided with a honeycomb structure body 4 and a plugging portion 5. The honeycomb structure body 4 is a pillar shape having an inflow end face 11 and an outflow end face 12. The honeycomb structure body 4 has a porous partition wall 1 disposed to surround a plurality of cells 2 extending from the inflow end face 11 to the outflow end face 12. The honeycomb structure body 4 shown in FIG. 1 or the like further includes a circumferential wall 3 disposed so as to encompass the partition wall 1. In the present invention, the cells 2 refer to a space surrounded with the partition wall 1. The plurality of cells 2 serve as fluid though channels.

The plugging portion 5 is disposed at either end of the inflow end face 11 side or outflow end face 12 side of the cell 2 formed in the honeycomb structure body 4, to plug open end of the cell 2. Hereinafter, the cell 2 in which the plugging portion 5 is disposed at the end of the outflow end face 12 side is referred to as "inflow cell 2a", and the cell 2 in which the plugging portion 5 is disposed at the end of the inflow end face 11 side is referred to as "outflow cell 2b".

The honeycomb structure 100 has a cell structure in which the shape of the cell 2 is polygonal and one inflow cell 2a and another inflow cell 2a are adjacent to each other with the partition wall 1 therebetween, in a section orthogonal to the extending direction of the cell 2 of the honeycomb structure body 4. Here, the cell structure means an arrangement pattern of a plurality of cells 2 defined by the porous partition wall 1. That is, the plugged honeycomb structure 100 has an arrangement pattern in which two inflow cells 2a are adjacent to each other with the partition wall 1 therebetween in the arrangement pattern of the cells 2 in the section of the honeycomb structure body 4. The plugged honeycomb structure 100 has a cell structure in which one inflow cell 2a and another inflow cell 2a are adjacent to each other with the partition wall 1 as described above, so that the ash capacity of the plugged honeycomb structure 100 can be increased extremely effectively.

Further, the plugged honeycomb structure 100 is configured such that the total area of the inflow cell 2a is larger than the total area of the outflow cell 2b, in a section orthogonal to the extending direction of the cell 2 of the honeycomb structure body 4. The total area of the inflow cells 2a is the sum of the areas of the inflow cells 2a in the above-described section of the honeycomb structure body 4 (that is, the open areas of the inflow cells 2a). Similarly, the total area of the outflow cells 2b is the sum of the areas of the outflow cells 2b in the above-described section of the honeycomb structure body 4 (that is, the open areas of the outflow cells 2b). Hereinafter, simply referring to the "section" of the honeycomb structure body 4 means the "section orthogonal to the extending directions of the cells 2" of the honeycomb structure body 4. In addition, simply referring to the "area" and the "total area" of the inflow cell 2a and the outflow cell 2b means the respective areas in the section of the honeycomb structure body 4.

In the aspect in which the total area of the inflow cell 2a is larger than the total area of the outflow cell 2b, the size relationship between each area of the individual inflow cell 2a and each area of the individual outflow cell 2b is not particularly limited. In other words, each area of the inflow cell 2a and each area of the outflow cell 2b may be the same or different. For example, when each area of the inflow cell 2a and each area of the outflow cell 2b is the same, the total area of the inflow cell 2a may be configured to be larger by making the total number Na of the inflow cell 2a relatively larger than the total number Nb of the outflow cell 2b. Even if each area of the inflow cells 2a is smaller than each area of the outflow cells 2b, the total area of the inflow cells 2a may be configured to be larger by making the total number Na of the inflow cells 2a relatively larger. On the other hand, when each area of the inflow cell 2a is larger than each area of the outflow cell 2b, the total number Na of the inflow cell 2a and the total number Nb the outflow cell 2b may be appropriately set so that the total area of the inflow cell 2a increases.

In the plugged honeycomb structure 100, in the section of the honeycomb structure body 4, the shape of one outflow cell 2b and the shape of one inflow cell 2a is congruent or similar, and the ratio of the total number Na of the inflow cells 2a with respect to the total number Nb of the outflow cells 2b is preferably 2 or more. Hereinafter, the "ratio of the total number Na of the inflow cells 2a with respect to the total number Nb of the outflow cells 2b" may be referred to as the cell number ratio (Na/Nb). For example, in the plugged honeycomb structure 100 shown in FIGS. 1 to 5, the relationship of "the total number Na of the inflow cells 2a: the total number Nb of the outflow cells 2b =2:1" is satisfied, and the cell number ratio (Na/Nb) is 2.

In the plugged honeycomb structure 100 shown in FIGS. 1 to 5, in the section of the honeycomb structure body 4, the shape of the inflow cell 2a and the shape of the outflow cell 2b are both hexagonal. The shape of the inflow cell 2a and the shape of the outflow cell 2b in the section of the honeycomb structure body 4 are not limited to hexagons, and may be other polygons such as triangles, squares, pentagons, and octagons. Hereinafter, "the shape of the cell 2" in a section orthogonal to the extending direction of the cell 2 of the honeycomb structure body 4 may be referred to as "the sectional shape of the cell 2" or simply "the shape of the cell 2". In this specification, the term "polygon" includes various polygons, a shape in which at least one corner of the polygon is formed in a curved shape, and a shape in which at least one corner of the polygon is chamfered linearly. For example, a "hexagon" includes a hexagon, a shape in which at least one corner of the hexagon is formed in a curved shape, and a shape in which at least one corner of the hexagon is chamfered linearly.

In the section of the honeycomb structure body 4, the shape of the inflow cell 2a may be one type or two or more types. Similarly, the shape of the outflow cell 2b may be one type or two or more types. In the plugged honeycomb structure 100, it is preferable that the shape of the inflow cell 2a is one type.

In the plugged honeycomb structure 100, in the section of the honeycomb structure body 4, it is preferable that the shape of one inflow cell 2a and the shape of one outflow cell 2b are congruent or similar. For example, when the shape of one of the inflow cells 2a of the plurality of inflow cells 2a is hexagonal, it is preferable that the shape of at least one outflow cells 2b of the plurality of outflow cells 2b is also hexagonal that is congruent or similar to the hexagon. In the plugged honeycomb structure 100 shown in FIGS. 1 to 5, the respective shapes of the inflow cell 2a and the outflow cell 2b are regular hexagonal. Honeycomb structure 100 is preferably hexagonal in both the shape of the inflow cell 2a and the shape of the outflow cell 2b. In addition, it is preferable that at least one or more cells 2 have a regular hexagonal shape.

In the plugged honeycomb structure 100, a porosity of the partition wall 1 of the honeycomb structure body 4 is 38% or more. If the porosity of the partition wall 1 is less than 38%, the pressure loss may be increased. The porosity of the partition wall 1 is preferably 38 to 75%, more preferably 38 to 65%. For example, if the porosity of the partition wall 1 is too high, the strength of the honeycomb structure body 4 may be insufficient, and it may be difficult to hold the plugged honeycomb structure 100 with adequate holding force when the plugged honeycomb structure 100 is housed in a can body used in an exhaust gas purification device. The porosity of the partition wall 1 is measured by a mercury porosimeter. As the mercury porosimeter, for example, Autopore 9500 (trade name) manufactured by Micromeritics Corporation can be used.

In the plugged honeycomb structure 100, a thickness T of the partition wall 1 is 125 μm or more and 280 μm or less. With this configuration, it is possible to obtain the plugged honeycomb structure 100 with low pressure loss while maintaining the isostatic strength. The thickness T of the partition wall 1 is preferably 125 μm or more and 254 μm or less, and more preferably 125 μm or more and 228 μm or less. The thickness T of the partition wall 1 is a length in a direction orthogonal to the surface of the partition wall 1 defining the two cells 2 in the section of the honeycomb structure body 4. As shown in FIG. 3, the partition wall 1 disposed between the inflow cell 2a and the outflow cell 2b is referred to as "first partition wall 1a", and the partition wall 1 disposed between the inflow cells 2a is referred to as "second partition wall 1b". In the plugged honeycomb structure 100, the thickness T1 of the first partition wall 1a and the thickness T2 of the second partition wall 1b are both 125 μm or more and 280 μm or less. The thickness T1 of the first partition wall 1a and the thickness T2 of the second partition wall 1b may be the same or different. The thickness T1 of the first partition wall 1a and the thickness T2 of the second partition wall 1b are preferably the same. The thickness T of the partition wall 1 can be measured using, for example, a microscope. As the microscope, for example, VHX-1000 (trade name) manufactured by KEYENCE Corporation, can be used.

In the plugged honeycomb structure 100, a cell density of the honeycomb structure body 4 is 31.0 cells/cm$^2$ or more. With this configuration, it is possible to suitably use the plugged honeycomb structure as a filter that traps PM in exhaust gas discharged from engines of automobiles or the like. The cell density of the honeycomb structure body 4 is 31 cells/cm$^2$ or more and 70 cells/cm$^2$ or less, more preferably 31 cells/cm$^2$ or more and 62 cells/cm$^2$ or less.

In the cell arrangement in which the inflow cells 2a are adjacent to each other, a partition wall 1 defining the inflow cells 2a (hereinafter also referred to as "IN-IN partition wall") is present. In a DPF with such an IN-IN partition wall, the initial pressure loss and the pressure loss with soot are higher than those of the conventional DPF due to the flow of gases. For example, although not shown, if the gas flows into "IN-OUT partition wall" which is the partition wall between the inflow cell and the outflow cell in the conventional DPF, the gas permeates the thickness of the soot and the thickness of the partition wall. In contrast, if a DPF with both the IN-IN partition wall and the IN-OUT partition wall as in this embodiment do not have soot, the flow of gases is concentrated on the IN-OUT partition wall and the pressure loss is higher than that of the conventional DPF. As soot deposits, the gas flows into the IN-IN wall as it is being dispersed. As soot and ash deposits progress and the resistance of the deposits increases, the pressure loss decreases compared to the conventional DPF. Therefore, a DPF with IN-IN walls have a great effect of lowering the permeability resistance of the partition wall 1 than the conventional DPF.

In the plugged honeycomb structure 100, an air-permeability resistance of the partition wall 1 is $4.5 \times 10^7$ Pa·s/m$^2$ or less. If the air-permeability resistance of the partition wall 1 exceeds $4.5 \times 10^7$ Pa·s/m$^2$, in the plugged honeycomb structure 100 having a cell structure in which the two inflow cells 2a are adjacent to each other with the partition wall 1 interposed therebetween, the pressure loss with soot due to the deposition of PM on the surface of the partition wall 1 increases. The substantial lower limit of the air-permeability resistance of the partition wall 1 is, for example, $1.0 \times 10^5$ Pa·s/m$^2$. Therefore, the air-permeability resistance of the partition wall 1 is preferably $1.0 \times 10^5$ Pa·s/m$^2$ or more and $4.5 \times 10^7$ Pa·s/m$^2$ or less, more preferably $1.0 \times 10^6$ Pa·s/m$^2$ or more and $4.0 \times 10^7$ Pa·s/m$^2$ or less.

The air-permeability resistance of the partition wall 1 can be measured in the following manner. First, a part of the partition wall 1 is cut out from the honeycomb structure body 4 of the plugged honeycomb structure 100. The part (position) where the partition wall 1 is cut out is not particularly limited. For example, in a segmented structured plugged honeycomb structure described later, it is possible to cut out from a part of a segment outer wall formed of the same material, but it is preferable to process the part constituting the partition wall 1 into a flat plate shape. Then, air at 25° C. is ventilated through the cut-out partition wall 1 by changing the flow rate with a mass flow meter, and the differential pressure of the air before and after permeating the partition wall 1 is measured with a pressure gauge. Then, the air-permeability resistance per unit area (mm$^2$) of the partition wall 1 (Pa·s/m$^2$) is calculated. More specifically, the flow rate (L/min) is converted to the flow velocity (m/s) by dividing the flow rate of the mass flow meter described above by the area of the partition wall 1. The differential pressure measured by the pressure gauge is obtained by dividing by the thickness (m) of the partition wall land measuring the differential pressure (Pa/m) per unit area (mm$^2$) of the partition wall 1. Then, the air-permeability resistance (Pa·s/m$^2$) per unit area (mm$^2$) of the partition wall 1 is calculated from the inclination of the X-axis flow velocity (m/s) and the Y-axis differential pressure (Pa/m). The condition of the flow rate is in the range from 0.1 to 1 m/s.

The plugged honeycomb structure 100 configured as described above can be suitably used, for example, as a filter that traps PM in exhaust gas. Then, the plugged honeycomb structure 100 can realize a lower pressure loss, when used as a filter that traps the PM in exhaust gas, as compared with the conventional plugged honeycomb structure. In particular, the plugged honeycomb structure 100 of the present embodiment has a cell structure in which one inflow cell 2a and another inflow cell 2a are adjacent to each other with the partition wall 1 interposed therebetween, and is configured such that the total area of the inflow cell 2a is larger than the total area of the outflow cell 2b, so that the ash capacity can be effectively increased. Further, the above-described configuration can realize a lower pressure loss by suppressing an increase in pressure loss with soot due to the deposition of PM on the surface of the partition wall 1 while increasing the ash capacity.

In the plugged honeycomb structure 100, a total open frontal area of the honeycomb structure body 4 is preferably greater than 35% and 95% or less. Here, the "total open frontal area" of the honeycomb structure body 4 means the percentage of the ratio of the total open area of the cell 2 formed in the honeycomb structure body 4 to the sectional area orthogonal to the extending direction of the cell 2 of the honeycomb structure body 4. The sectional area orthogonal to the extending direction of the cell 2 of the honeycomb structure body 4 shall not include the area of the circumferential wall 3 disposed on the outermost circumference of the honeycomb structure body 4.

The average pore diameter of the partition wall 1 is not particularly limited, and it is preferably 7 to 25 µm, and more preferably 9 to 20 µm. The average pore diameter of the partition wall 1 is measured by a mercury porosimeter. As the mercury porosimeter, for example, Autopore 9500 (trade name) manufactured by Micromeritics Corporation can be used.

In the plugged honeycomb structure 100, a geometric surface area of the partition wall 1 disposed so as to surround the inflow cell 2a is preferably 1.00 to 1.40 $cm^2/cm^3$, more preferably 1.10 to 1.40 $cm^2/cm^3$. Here, the "geometric surface area" means a value (S/V) obtained by dividing the total internal surface area (S) of the inflow cell 2a by the total volume (V) of the honeycomb structure body. Generally, as the filtering area of the filter is larger, the thickness of the PM deposited on partition wall 1 disposed so as to surround the inflow cell 2a can be reduced, and therefore, pressure loss of the plugged honeycomb structure can be suppressed by setting the geometric surface area to the above numerical ranges. Therefore, if the geometric surface area of the inflow cell 2a is too small, it is not preferable because it may lead to increased pressure loss with soot during PM deposition. Further, if the geometric surface area of the inflow cell 2a is too large, it is not preferable because the initial pressure loss may be increased. Hereinafter, the geometric surface area described above may be referred to as "GSA" or "geometric surface area GSA". GSA is an abbreviation for "Geometric Surface Area".

The material of the partition wall 1 is not particularly limited. Examples of the material of the partition wall 1 include ceramics. In particular, the partition wall 1 preferably includes silicon carbide, silicon-bonded silicon carbide, binder sintering type ceramic material, mullite, cordierite or aluminum titanate. Incidentally, "silicon-bonded silicon carbide" means, for example, silicon carbide particles as aggregates as shown in JP-B-4136319, those bonded by metallic silicon. The "binder sintering type ceramic material" means, for example, a ceramic material in which aggregates such as silicon carbide or mullite as shown in JP-A-2015-67473 are bonded by a binder such as cordierite, and is produced by sintering.

The material of the plugging portion 5 is not particularly limited, and those mentioned as the material of the partition wall 1 described above can be suitably used.

The overall shape of the plugged honeycomb structure 100 is not particularly limited. In the overall shape of the plugged honeycomb structure 100, the shape of the inflow end face 11 and the outflow end face 12 is preferably circular or elliptical, particularly preferably circular. Further, the size of the plugged honeycomb structure 100, for example, the length from the inflow end face 11 to the outflow end face 12 of the honeycomb structure body 4, the size of the section orthogonal to the extending direction of the cell 2 of the honeycomb structure body 4 is not particularly limited. Each size may be appropriately selected so as to obtain the optimum purifying performance when the plugged honeycomb structure 100 is used as a filter for purifying exhaust gas The plugged honeycomb structure 100 can be suitably used as a member for purifying exhaust gas of an internal combustion engine. The plugged honeycomb structure 100 may be loaded with a catalyst for purifying exhaust gas on at least one of the surface of the partition wall 1 and the pore of the partition wall 1 of the honeycomb structure body 4. Examples of the catalyst for purifying exhaust gas include an oxidation catalyst, a selective catalytic reduction catalyst, and a three-way catalyst.

Examples of the oxidation catalyst include a catalyst containing a noble metal. Specific examples of the oxidation catalyst include those containing at least one selected from the group consisting of platinum (Pt), palladium (Pd) and rhodium (Rh), and the like. When the partition wall 1 is loaded with the oxidation catalyst, a loading amount of the oxidation catalyst is preferably 0.1 to 30 g/L. Here, the loading amount (g/L) of the catalyst is the amount (g) of the catalyst which is loaded per unit volume (1 L) of the honeycomb structure body 4.

The selective catalytic reduction catalysts are catalysts that selectively reduce purify components. Hereinafter, a selective catalytic reduction catalyst is also referred to as "SCR catalyst". "SCR" is an abbreviation for "Selective Catalytic Reduction". The selective catalytic reduction catalyst is preferably a zeolite-type selective catalytic reduction catalyst or a vanadium-type selective catalytic reduction catalyst. The zeolite-type selective catalytic reduction catalyst refers to a catalyst comprising a catalytically active component containing zeolite. As the zeolite-type selective catalytic reduction catalyst, for example, a selective catalytic reduction catalyst comprising a metal-substituted zeolite can be mentioned. Examples of the metal that substitutes zeolite include iron (Fe) and copper (Cu). Preferred examples of the zeolite include A-type, X-type, CHA-type, LTA-type, MFI-type, PER-type, FAU-type, DDR-type, and beta zeolite. The vanadium-type selective catalytic reduction catalyst refers to a catalyst comprising a catalytically active component containing vanadium. As the vanadium-type selective catalytic reduction catalyst, for example, a catalyst containing vanadium or tungsten as a main component can be mentioned. The loading amount of the selective catalytic reduction catalyst is preferably from 50 to 130 g/L.

The three-way catalyst refers to a catalyst that purify primarily hydrocarbon (HC), carbon monoxide (CO), and nitrous oxide ($NO_x$). Examples of the three-way catalyst include catalysts containing platinum (Pt), palladium (Pd), and rhodium (Rh). The loading amount of the three-way catalyst is preferably 40 to 130 g/L.

Next, a method for manufacturing the plugged honeycomb structure of the present embodiment will be described. However, the method for manufacturing the plugged honeycomb structure is not limited to the manufacturing method described below.

First, a plastic kneaded material for producing a honeycomb structure body is prepared. The kneaded material for producing the honeycomb structure body can be prepared by adding an additive such as a binder, and water as needed to a material selected as a raw material powder from the above-described materials suitable for the partition wall.

The produced kneaded material is then extruded to obtain a pillar-shaped honeycomb formed body having a partition wall defining a plurality of cells and a circumferential wall disposed on outermost circumference. In the extrusion, a die for the extrusion may have a slit in the reversed shape of the honeycomb formed body to be formed, on the extruding face of the kneaded material. The obtained honeycomb formed body may be dried, for example, with microwaves and hot air Next, open end of the cell is plugged with a material similar to the material used to produce the honeycomb formed body to form a plugging portion. The method for forming the plugging portion can be performed in accordance with a conventionally known method for manufacturing the plugged honeycomb structure.

Next, the obtained honeycomb formed body is fired to obtain a plugged honeycomb structure. The firing temperatures and the firing atmosphere differ according to the raw material, and those skilled in the art can select the firing temperature and the firing atmosphere that are the most suitable for the selected material.

(2) Plugged Honeycomb Structure (Second Embodiment)

Figure 6:
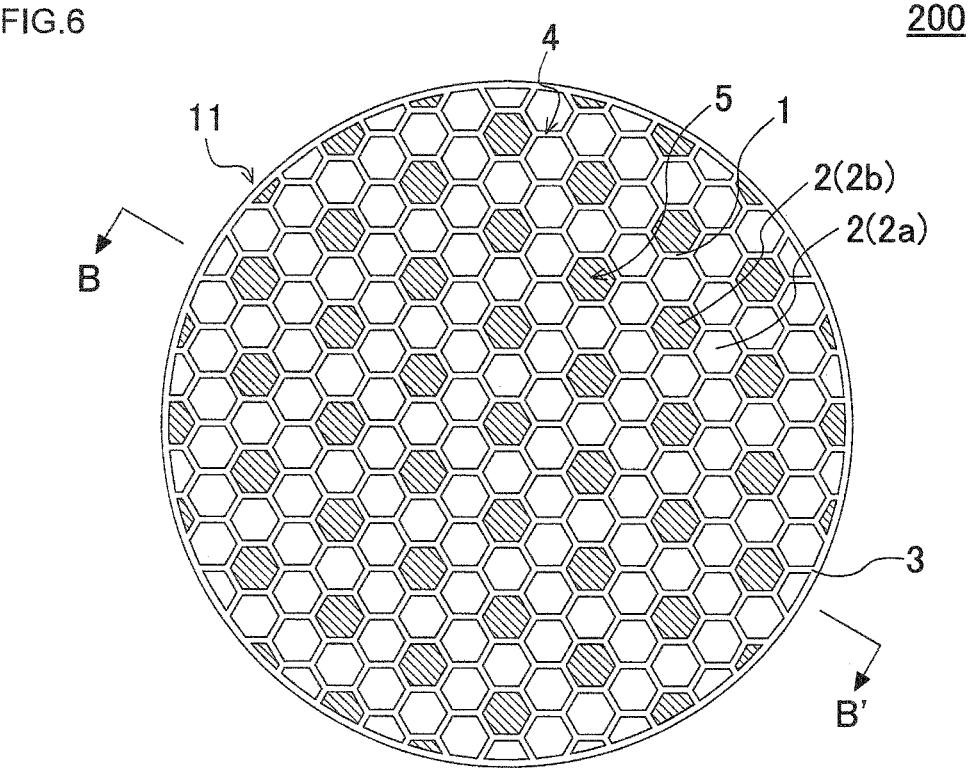
FIG. 6 is a plan view schematically showing the inflow end face of the second embodiment of the plugged honeycomb structure of the present invention.
Figure 7:
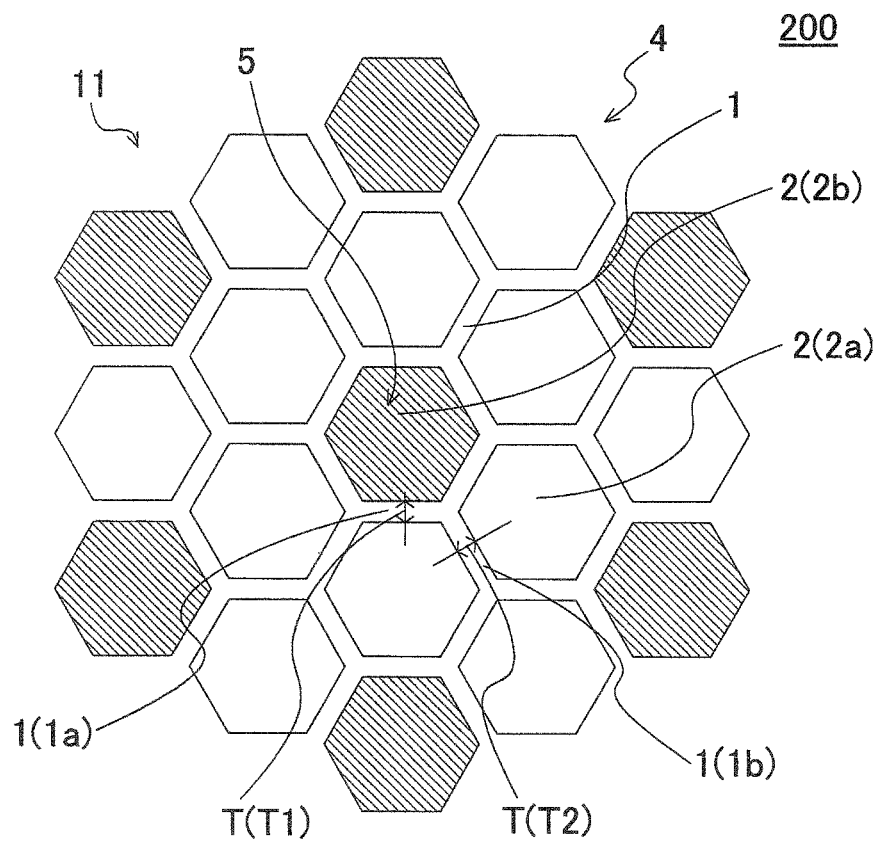
FIG. 7 is an enlarged plan view in which a portion of the inflow end face shown in FIG. 6 is enlarged.
Figure 8:
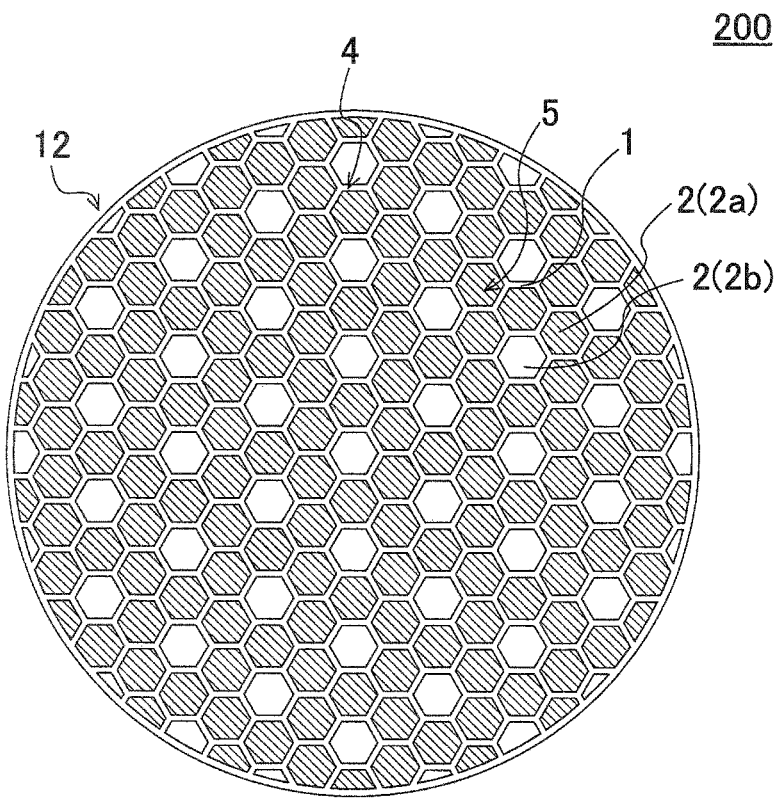
FIG. 8 is a plan view schematically showing the outflow end face of the plugged honeycomb structure shown in FIG. 6.
Figure 9:
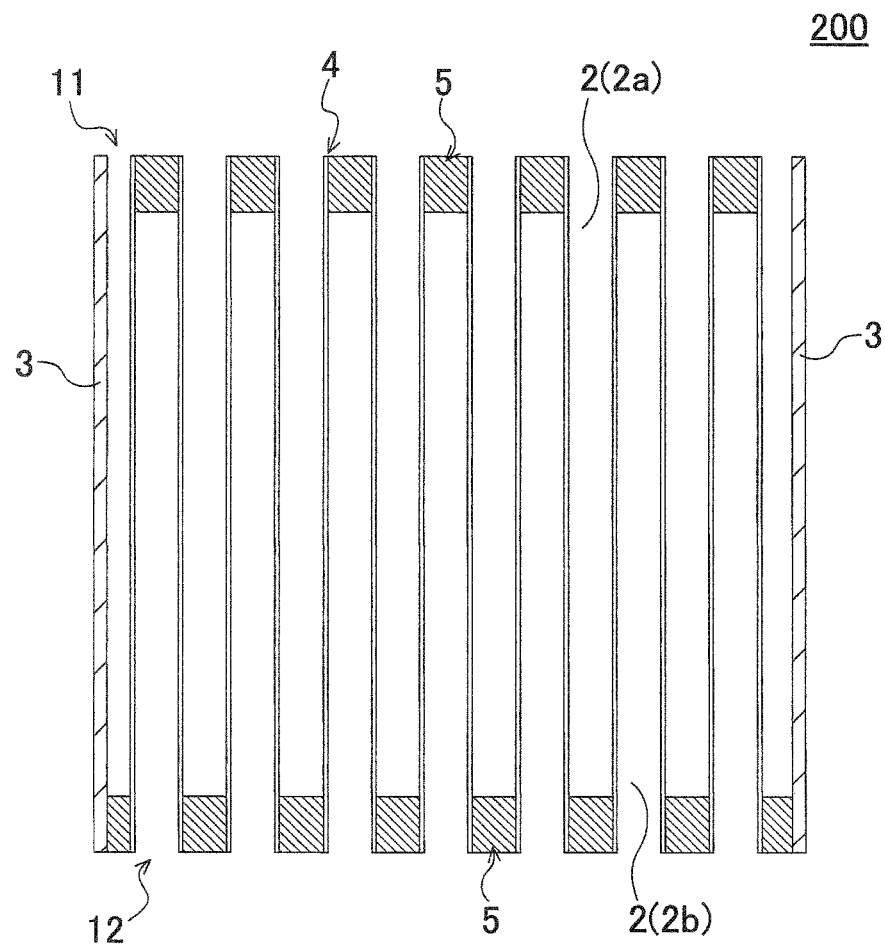
FIG. 9 is a sectional view schematically showing the section taken along the line B-B' of FIG. 6.

Next, referring to FIGS. 6-9, a second embodiment of the plugged honeycomb structure 200 will be described. Here, FIG. 6 is a plan view schematically showing the inflow end face of the second embodiment of the plugged honeycomb structure of the present invention. FIG. 7 is an enlarged plan view in which a part of the inflow end face shown in FIG. 6 is enlarged. FIG. 8 is a plan view schematically showing the outflow end face of the plugged honeycomb structure shown in FIG. 6. FIG. 9 is a sectional view schematically showing a section taken along the line B-B' of FIG. 6.

The plugged honeycomb structure 200 is provided with a honeycomb structure body 4 and a plugging portion 5. The honeycomb structure body 4 is a pillar-shaped having an inflow end face 11 and an outflow end face 12. The honeycomb structure body 4 has a porous partition wall 1 disposed so as to surround a plurality of cells 2 extending from the inflow end face 11 to the outflow end face 12. The plugging portion 5 is disposed at either end of the inflow end face 11 side or outflow end face 12 side of the cell 2 formed in the honeycomb structure body 4, to plug open end of the cell 2.

The honeycomb structure 200 has a cell structure in which the shape of the cell 2 is polygonal and one inflow cell 2a and another inflow cell 2a are adjacent to each other with the partition wall 1 therebetween, in a section orthogonal to the extending direction of the cell 2 of the honeycomb structure body 4.

Also in the plugged honeycomb structure 200, in the section of the honeycomb structure body 4, the shape of the inflow cell 2a and the shape of the outflow cell 2b are both hexagonal. However, in the plugged honeycomb structure 200, the numbers of the inflow cell 2a and the outflow cell 2b and the arrangement thereof are different from those of the plugged honeycomb structure 100 of the first embodiment described so far (see FIGS. 1 to 5). Specifically, the plugged honeycomb structure 200 shown in FIGS. 6 to 9 satisfies the relationship of "total number Na of inflow cells 2a: total number Nb of outflow cells 2b=3:1", and the cell number ratio (Na/Nb) is 3. In the section of the honeycomb structure body 4 of the plugged honeycomb structure 200, the total area of the inflow cell 2a is configured to be larger than the total area of the outflow cell 2b.

The plugged honeycomb structure 200 has a porosity of the partition wall 1 of 38% or more and a thickness of the partition wall 1 of 125 μm or more and 280 μm or less. In the plugged honeycomb structure 200, the cell density of the honeycomb structure body 4 is 31.0 cells/cm$^2$ or more. Further, in the plugged honeycomb structure 200, the air-permeability resistance of the partition wall 1 is 4.5× 10$^7$Pa·s/m$^2$ or less. The porosity, the thickness, and the air-permeability resistance of the partition wall 1 and the cell density of the honeycomb structure body 4 are preferably configured in the same manner as the plugged honeycomb structure 100 of the first embodiment (see FIGS. 1 to 5).

The plugged honeycomb structure 200 is preferably configured in the same manner as the plugged honeycomb structure 100 of the first embodiment (see FIGS. 1 to 5) except that the numbers of the inflow cells 2a and the outflow cells 2b and the arrangement thereof differ as described above. In FIGS. 6 to 9, the same components as those of the plugged honeycomb structure 100 shown in FIGS. 1 to 5 are denoted by the same reference numerals, and descriptions thereof may be omitted.

The plugged honeycomb structure 200 configured as described above can also realize a lower pressure loss as compared with the conventional plugged honeycomb structure, when used as a filter that traps the PM in exhaust gas. In addition, similarly to the plugged honeycomb structure 100 of the first embodiment described so far (see FIGS. 1 to 5), it can realize a lower pressure loss by suppressing an increase in pressure loss with soot due to the deposition of PM on the surface of the partition wall 1 while increasing the ash capacity.

(3) Plugged Honeycomb Structure (Third Embodiment)

Figure 10:
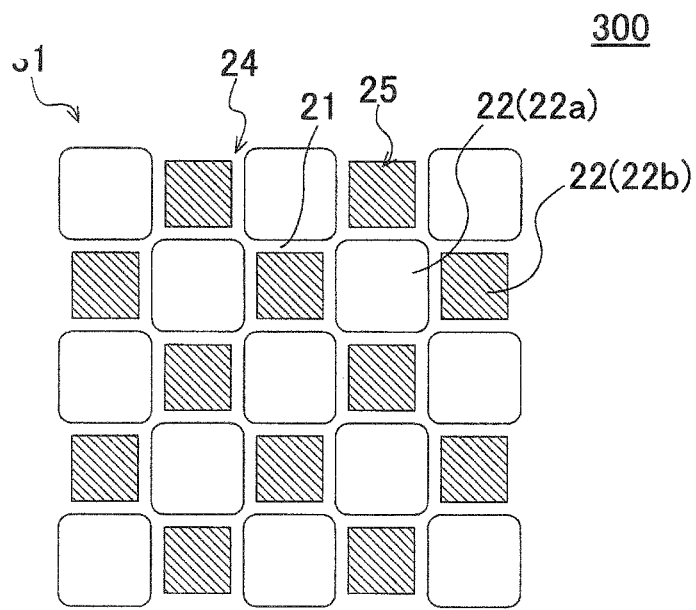
FIG. 10 is an enlarged plan view in which a portion of the inflow end face of the third embodiment of the plugged honeycomb structure of the present invention is enlarged.
Figure 11:
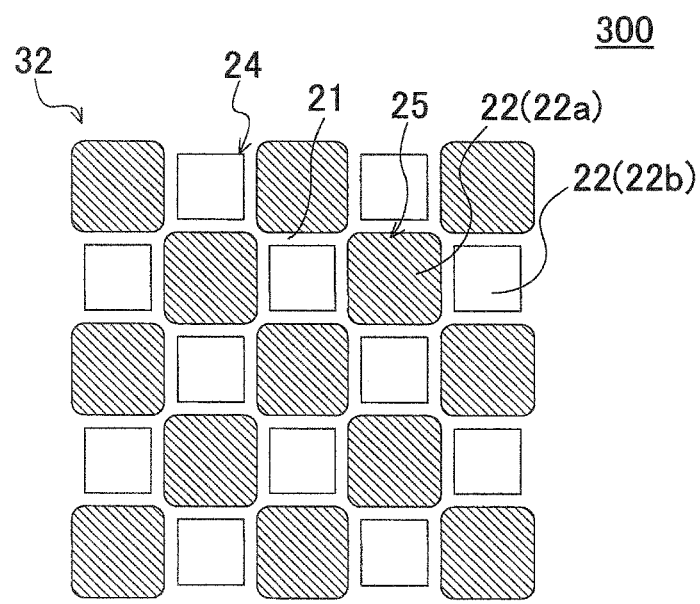
FIG. 11 is an enlarged plan view in which a portion of the outflow end face of the plugged honeycomb structure shown in FIG. 10 is enlarged.

Next, referring to FIGS. 10 and 11, the plugged honeycomb structure 300 of the third embodiment will be described. Here, FIG. 10 is an enlarged plan view in which a part of the inflow end face of the third embodiment of the plugged honeycomb structure of the present invention is enlarged. FIG. 11 is an enlarged plan view in which a part of the outflow end face of the plugged honeycomb structure shown in FIG. 10 is enlarged.

The plugged honeycomb structure 300 is provided with a pillar-shaped honeycomb structure body 24 having an inflow end face 31 and an outflow end face 32, and a plugging portion 25. The honeycomb structure body 24 is configured to, for example, have a pillar-shape having an inflow end face 31 and outflow end face 32, similarly to the plugged honeycomb structure 100 of the first embodiment described so far (see FIGS. 1 to 5). In addition, the honeycomb structure body 24 has a porous partition wall 21 disposed so as to surround a plurality of cells 22 extending from the inflow end face 31 to the outflow end face 32. The plugging portion 25 is disposed at one end of either the inflow end face 31 side or the outflow end face 32 side of the cell 22 formed in the honeycomb structure body 24, to plug open end of the cell 22.

The plugged honeycomb structure 300 has a cell structure in which the shape of the cell 22 is polygonal in a section orthogonal to the extending direction of the cell 22 of the honeycomb structure body 24, and one inflow cell 22a and another inflow cell 22a are adjacent to each other with the partition wall 21 interposed therebetween. Specifically, the shapes of the cells 22 are quadrangular and octagonal, and the quadrangular cell 22 and the octagonal cell 22 are alternately arranged with the partition wall 21 interposed therebetween, in the vertical direction and the horizontal direction of the sheet of FIGS. 10 and 11. In the plugged honeycomb structure 300, when comparing the respective areas of the quadrangular cell 22 and the octagonal cell 22, the octagonal cell 22 is configured so that the area is larger. Then, the octagonal cell 22 is an inflow cell 22a in which the plugging portion 25 is disposed at the end of the outflow end face 32 side. On the other hand, the quadrangular cell 22 is an outflow cell 22b in which the plugging portion 25 is disposed at the end of the inflow end face 31. Therefore, the plugged honeycomb structure 300 is configured so that the total area of the inflow cell 22a is larger than the total area of the outflow cell 22b, in section of honeycomb structure body 24. The octagonal inflow cell 22a having a relatively large area is disposed so as to be adjacent to each other with the partition wall 21 interposed therebetween in the oblique directions of the sheet of FIGS. 10 and 11. For this reason, the plugged honeycomb structure 300 has a cell structure in which one inflow cell 22a and another inflow cell 22a are adjacent to each other with the partition wall 21 interposed therebetween in the oblique directions of the sheet of FIGS. 10 and 11.

In the plugged honeycomb structure 300, the porosity of the partition wall 21 is 38% or more, and the thickness of the partition wall 21 is 125 μm or more and 280 μm or less. In the plugged honeycomb structure 300, the cell density of the honeycomb structure body 24 is 31.0 cells/cm$^2$ or more. Furthermore, in the plugged honeycomb structure 300, the air-permeability resistance of the partition wall 21 is 4.5× 10$^7$Pa·s/m$^2$ or less. The porosity, the thickness, and the air-permeability resistance of the partition wall 21, and the cell density of the honeycomb structure body 24 are preferably configured similarly to the plugged honeycomb structure 100 of the first embodiment (see FIGS. 1 to 5).

The plugged honeycomb structure 300 configured as described above can also realize a lower pressure loss by suppressing an increase in pressure loss with soot due to the deposition of PM on the surface of the partition wall 21 while increasing the ash capacity as compared with the conventional plugged honeycomb structure, when used as a filter that traps PM in exhaust gas.

(4) Plugged Honeycomb Structure (Fourth Embodiment)

Figure 12:
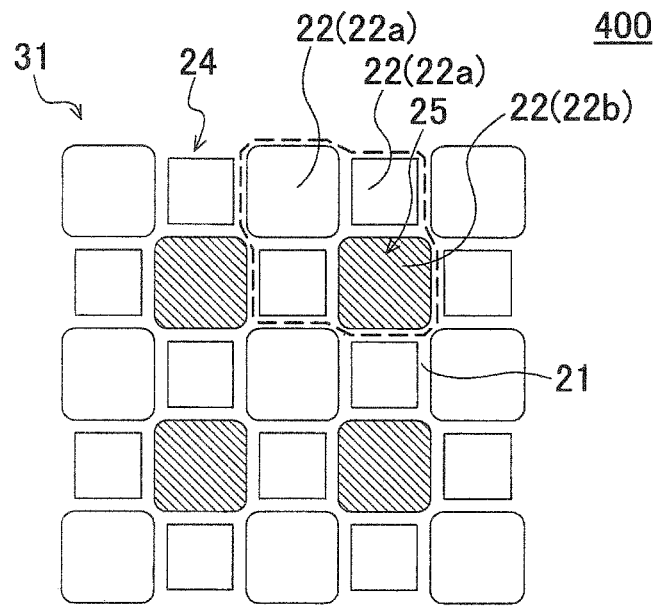
FIG. 12 is an enlarged plan view in which a portion of the inflow end face of the fourth embodiment of the plugged honeycomb structure of the present invention is enlarged.
Figure 13:
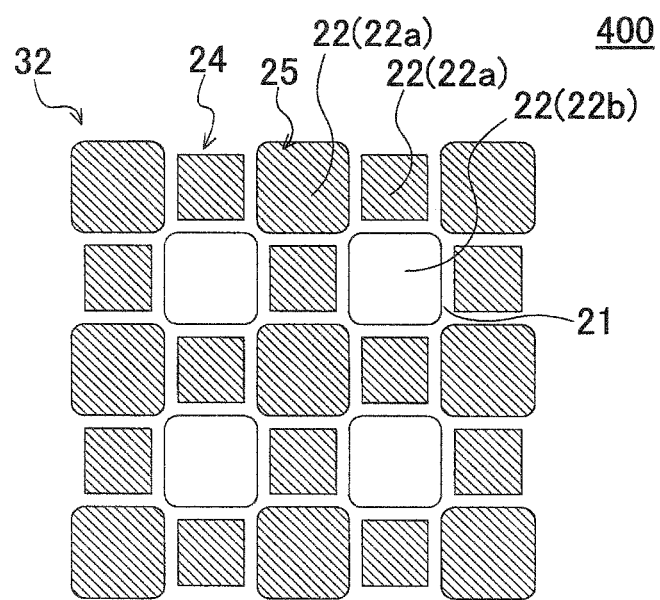
FIG. 13 is an enlarged plan view in which a portion of the outflow end face of the plugged honeycomb structure shown in FIG. 12 is enlarged.

Next, referring to FIGS. 12 and 13, the plugged honeycomb structure 400 of the fourth embodiment will be described. Here, FIG. 12 is an enlarged plan view in which a part of the inflow end face of the plugged honeycomb structure of the fourth embodiment of the present invention is enlarged. FIG. 13 is an enlarged plan view in which a part of the outflow end face of the plugged honeycomb structure shown in FIG. 12 is enlarged.

The plugged honeycomb structure 400 is provided with a pillar-shaped honeycomb structure body 24 having an inflow end face 31 and an outflow end face 32, and a plugging portion 25. The honeycomb structure body 24, similarly to the plugged honeycomb structure 100 of the first embodiment described so far (see FIGS. 1 to 5), for example, is configured to have a round pillar-shape having an inflow end face 31 and outflow end face 32. In addition, the honeycomb structure body 24 has a porous partition wall 21 disposed so as to surround a plurality of cells 22 extending from the inflow end face 31 to the outflow end face 32. The plugging portion 25 is disposed at one end of either the inflow end face 31 side or the outflow end face 32 side of the cell 22 formed in the honeycomb structure body 24, to plug open end of the cell 22.

Similarly to the plugged honeycomb structure 300 of the third embodiment described so far (see FIGS. 10 and 11), in the plugged honeycomb structure 400, the shapes of the cells 22 are quadrangular and octagonal in the section of the honeycomb structure body 24. In addition, the quadrangular cell 22 and the octagonal cell 22 are alternately arranged with the partition wall 21 interposed therebetween, in the vertical direction and the horizontal direction of the paper surface of FIGS. 12 and 13. However, in the plugged honeycomb structure 400, the numbers of the inflow cells 22a and the outflow cells 22b and the arrangement thereof are different from those of the plugged honeycomb structure 300 of the third embodiment (see FIGS. 10 and 11). Specifically, in the plugged honeycomb structure 400, the inflow cell 22a and the outflow cell 22b are arranged such that, when one octagonal cell 22 is an outflow cell 22b, eight cells 22 arranged around the outflow cell 22b are the inflow cells 22a. The eight inflow cells 22a arranged around the octagonal outflow cells 22b are composed of four octagonal cells 22 and four quadrangular cells 22, and the octagonal cells 22 and the quadrangular cells 22 are arranged so as to alternately surround the octagonal outflow cells 22b. Therefore, the plugged honeycomb structure 400 has a cell structure in which the octagonal inflow cell 22a and the quadrangular inflow cell 22a are adjacent to each other with the partition wall 21 interposed therebetween. Furthermore, in the section of the honeycomb structure body 24 of the plugged honeycomb structure 400, the total area of the inflow cell 22a is configured to be larger than the total area of the outflow cell 22b.

In the plugged honeycomb structure 400, the porosity of the partition wall 21 is 38% or more, and the thickness of the partition wall 21 is 125 μm or more and 280 μm or less. In the plugged honeycomb structure 400, the cell density of the honeycomb structure body 24 is 31.0 cells/cm$^2$ or more. Furthermore, in the plugged honeycomb structure 400, the air-permeability resistance of the partition wall 21 is 4.5× 10$^7$Pa·s/m$^2$ or less. The porosity, the thickness, and the air-permeability resistance of the partition wall 21 and the cell density of the honeycomb structure body 24 are preferably configured in the same manner as in the plugged honeycomb structure 300 of the third embodiment (see FIGS. 10 and 11).

The plugged honeycomb structure 400 is preferably configured in the same manner as the plugged honeycomb structure 300 of the third embodiment (see FIGS. 10 and 11) except that the arrangement of the inflow cell 22a and the outflow cell 22b differ as described above. In FIGS. 12 and 13, the same components as those of the plugged honeycomb structure 300 shown in FIGS. 10 and 11 are denoted by the same reference numerals, and descriptions thereof may be omitted. In FIG. 12, an area surrounded by a dotted line represents the smallest repeating unit (one unit) in the cell structure of the plugged honeycomb structure 400.

The plugged honeycomb structure 400 configured as described above can also realize a lower pressure loss by suppressing the increase in pressure loss with soot due to the deposition of PM on the surface of the partition wall 21 while increasing the ash capacity as compared with the conventional plugged honeycomb structure, when used as a filter that traps PM in exhaust gas.

(5) Plugged Honeycomb Structure (Fifth Embodiment)

Next, referring to FIGS. 14 and 15, a fifth embodiment of the plugged honeycomb structure 700 will be described.

Figure 14:
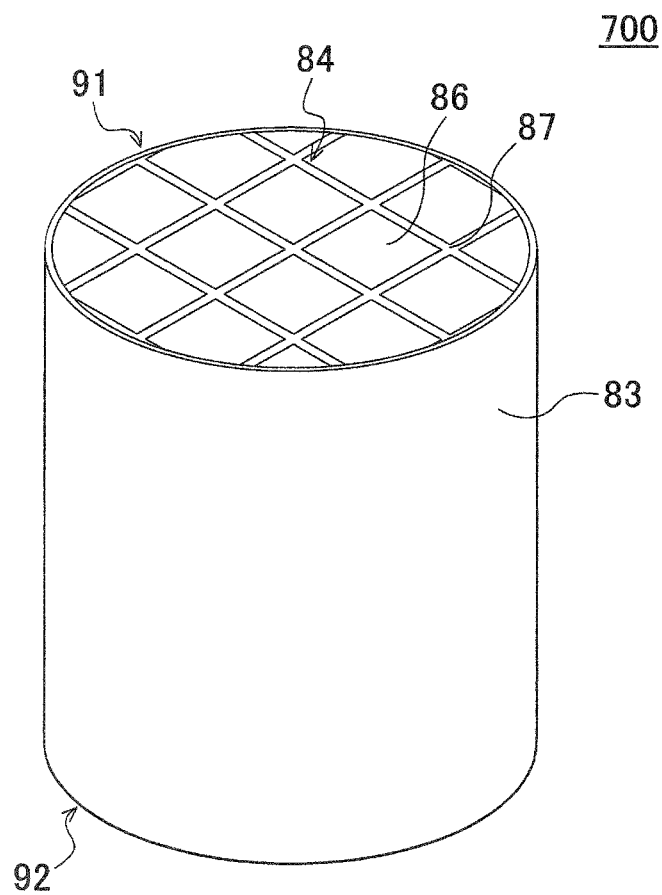
FIG. 14 is a perspective view schematically showing the fifth embodiment of the plugged honeycomb structure of the present invention as viewed from the inflow end face side.
Figure 15:
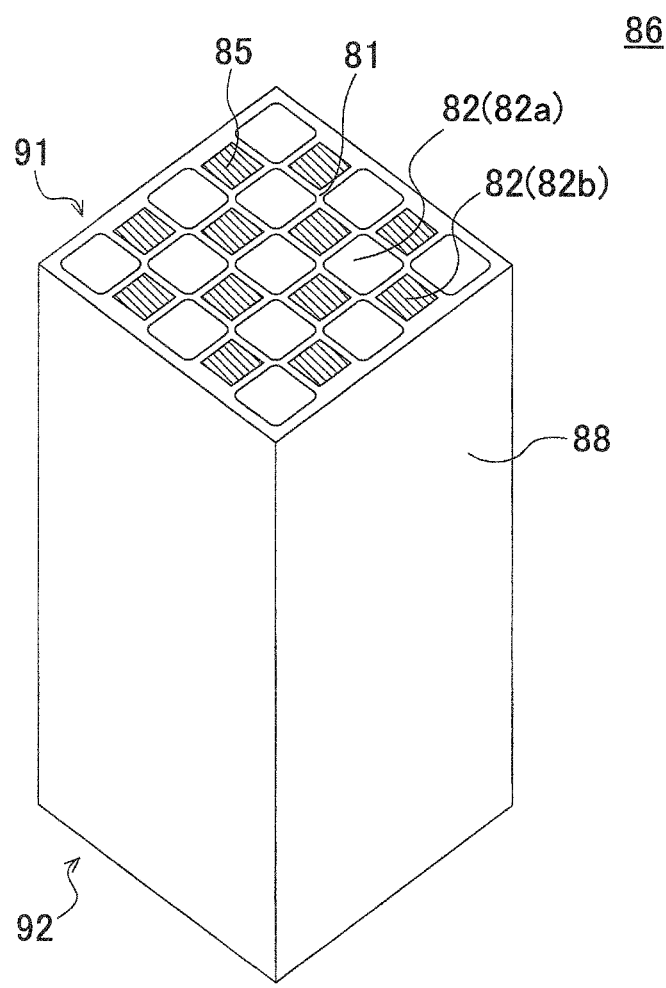
FIG. 15 is a perspective view schematically showing a honeycomb segment used in the plugged honeycomb structure shown in FIG. 14 as viewed from the inflow end face side.

FIG. 14 is a perspective view schematically showing a fifth embodiment of the plugged honeycomb structure of the present invention as viewed from the inflow end face side. FIG. 15 is a perspective view schematically showing a honeycomb segment used in the plugged honeycomb structure shown in FIG. 14 as viewed from the inflow end face side.

As shown in FIG. 14, the plugged honeycomb structure 700 of the fifth embodiment is a plugged honeycomb structure 700 provided with a segmented structured honeycomb structure body 84. That is, in the plugged honeycomb structure 700, the honeycomb structure body 84 is constituted by a plurality of pillar-shaped honeycomb segment 86, and the side surfaces of the plurality of honeycomb segments 86 are bonded each other by bonding layer 87. The term "segmented structured honeycomb structure body 84" as used herein refers to the honeycomb structure body 84 in which a plurality of individually produced honeycomb segments 86 are bonded by bonding layer 87. Incidentally, as shown in FIGS. 1 to 5, the honeycomb structure body in which all the partition wall 1 are integrally formed sometimes referred to as "integrated honeycomb structure body 4". The honeycomb structure body in the plugged honeycomb structure of the present invention may be "segmented structured honeycomb structure body 84" as shown in FIG. 14, or "integrated honeycomb structure body 4" as shown in FIG. 1, for example. Incidentally, FIG. 14 is drawn in a shape obtained by discarding the partition wall and cells on the inflow end face 91 of the honeycomb segments 86.

As shown in FIG. 14, the plugged honeycomb structure 700 is provided with a pillar-shaped honeycomb structure body 84 having an inflow end face 91 and an outflow end face 92. The honeycomb segment 86 constituting the honeycomb structure body 84 has a porous partition wall 81 disposed so as to surround a plurality of cells 82 extending from the inflow end face 91 to the outflow end face 92, as shown in FIG. 15. The honeycomb segment 86 further includes a segment outer wall 88 disposed so as to encompass the partition wall 81.

At either end of the inflow end face 91 side or outflow end face 92 side of the cells 82 formed in the honeycomb segment 86, the plugging portion 85 is disposed. Thus, the cell 82 in which the plugging portion 85 is disposed at the end of the outflow end face 92 side is the "inflow cell 82a", the cell 82 in which the plugging portion 85 is disposed at the end of the inflow end face 91 side is the "outflow cell 82b". The honeycomb segment 86 shown in FIG. 15 is not particularly limited, however, it has a cell structure similar to that of the plugged honeycomb structure 300 of the third embodiment shown in FIGS. 10 and 11.

The honeycomb structure body 84 shown in FIG. 14 is preferably configured in the same manner as the honeycomb structure body of the plugged honeycomb structure of the first embodiment to the fourth embodiment described above. That is, in the honeycomb structure body 84, the total area of the inflow cells 82a is larger than the total area of the outflow cells 82b in a section orthogonal to the extending directions of the cells 82. In addition, the porosity of the partition wall 81 is 38% or more, and the thickness of the partition wall 81 is 125 μm or more and 280 μm or less. The cell density of the honeycomb structure body 84 is 31.0 cells/cm² or more. Further, the air-permeability resistance of the partition wall 81 is $4.5 \times 10^7$ Pa·s/m² or less. For example, the porosity, the thickness, and the air-permeability resistance of the partition wall 81, and the cell density of the honeycomb structure body 84 are preferably configured in the same manner as the plugged honeycomb structure 300 of the third embodiment (see FIGS. 10 and 11).

The plurality of honeycomb segments 86 constituting honeycomb structure body 84 shown in FIG. 14 may have the same cell structure, or may have different cell structures.

A circumferential wall 83 in the plugged honeycomb structure 700 is preferably a circumference coat layer formed by a circumference coating material. The circumference coating material is a coating material for forming the circumference coat layer by being applied to the circumference of a bonded body in which a plurality of honeycomb segments 86 is bonded. Further, the bonded body in which the plurality of honeycomb segments 86 is bonded is preferably grinded the circumferential portion thereof and provided the circumferential coat layer described above.

The plugged honeycomb structure 700 configured as described above can also realize a lower pressure loss by suppressing an increase in pressure loss with soot due to the deposition of PM on the surface of the partition wall 81 while increasing the ash capacity as compared with the conventional plugged honeycomb structure, when used as a filter that traps PM in exhaust gas.

EXAMPLES

The following describes the present invention more specifically by examples, however, the present invention is not limited at all by the examples.

Example 1

First, a kneaded material for producing a honeycomb structure body was prepared. In Example 1, as a raw material powder for preparing a kneaded material, a mixed powder obtained by mixing silicon carbide (SiC) powder and metallic silicon (Si) powder at a mass ratio of 80:20 was prepared. To this mixed powder, a binder, pore former, and water were added to form a forming raw material. Next, the forming raw material was kneaded to prepare a kneaded material of round pillar-shaped. Note that when a honeycomb structure body is prepared from kneaded material prepared using the above-described materials, "SiC" is described in the columns of "Material" in Tables 2, 4, 6, and 8.

Next, the honeycomb formed body having a round-pillar shape as a whole shape was obtained by extruding kneaded material using a die for producing the honeycomb formed body.

Next, the honeycomb formed body was dried by a microwave dryer, and was further dried completely by a hot-air dryer, and then both end faces of the honeycomb formed body were cut so as to have predetermined dimensions.

Next, a plugging portion was formed on the dried honeycomb formed body. Specifically, first, a mask was provided to the inflow end face of the honeycomb formed body so that the inflow cell is covered. Thereafter, the end of the honeycomb formed body provided with the mask was immersed in the plugging slurry, and the plugging slurry was filled in open end of the outflow cell without the mask. Thereafter, also in the outflow end face of the honeycomb formed body, the open end of the inflow cell was filled with the plugging slurry in the same manner as described above. Thereafter, the honeycomb formed body having the plugging portion formed was further dried by a hot air dryer.

Next, the honeycomb formed body having the plugging portion formed was formed was degreased and fired to obtain a plugged honeycomb structure.

In the plugged honeycomb structure of Example 1, the shape of the cell 22 is quadrangular and octagonal, and the quadrangular cells 22 and octagonal cells 22 were arranged alternately with the partition wall 21 interposed therebetween in the section of the honeycomb structure body 24, as shown in the plugged honeycomb structure 300 shown in FIGS. 10 and 11. In addition, the octagonal cell 22 was the inflow cell 22a, and the quadrangular cell 22 was the outflow cell 22b. In the column of "Cell shape" in Table 1, the cell shape of the plugged honeycomb structure of Example 1 is shown. In the column of "Reference drawing" in Table 1, the numbers of drawings for referring to the cell structures (in other words, the arrangement of the inflow cells and the outflow cells) in the respective Example are shown.

In the plugged honeycomb structure of Example 1, the diameter of the end face was 267 mm, and the length in the extending direction of the cell was 203 mm. The thickness of the partition wall was 152 μm, the porosity of the partition wall was 38%, and the cell density was 46.5 cells/cm². The porosity of the partition wall is measured by a mercury porosimeter. The plugged honeycomb structure of Example 1 satisfies the relation of "total number of inflow cells Na: total number of outflow cells Nb=1:1", and the cell number ratio (Na/Nb) was 1. The average pore diameter of the partition wall was 8 μm, and the geometric surface area (GSA) of the inflow cell was 1.30 mm²/mm³. The results are shown in Table 1 or 2.

In the plugged honeycomb structure of Example 1, total open frontal area of all cells was 81%, total open frontal area of inflow cells was 49%, and total open frontal area of outflow cells was 32%. "Total open frontal area of all cells" represents the percentage of the ratio of the total open area of all cells to the sectional area of the honeycomb structure body constituting the plugged honeycomb structure. Similarly, "total open frontal area of inflow cells" and "total open frontal area of outflow cells" represent the percentage of the ratio of the total open area of the inflow cells and the total open area of the outflow cells to the sectional area of the honeycomb structure body. Table 1 shows the results.

For the plugged honeycomb structure of Example 1, the "Air-permeability resistance of Partition wall" was measured in the following manner. Table 2 shows the result. The plugged honeycomb structure of Example 1 was evaluated for "Increase in pressure loss ΔP" in the following manner. Table 2 shows the result.

(Air-Permeability Resistance of Partition Wall (Pa·s/m²))

A part of the partition wall was cut out from the honeycomb structure body of the plugged honeycomb structure. Then, air at 25° C. is ventilated through the cut-out partition wall 1 while changing flow rate by a mass flow meter, and the differential pressure of the air before and after permeating the partition wall was measured by a pressure gauge. Then, the air-permeability resistance per unit area (mm²) of the partition wall (Pa·s/m²) was calculated.

(Increase in Pressure Loss ΔP)

First, the pressure loss of the plugged honeycomb structure was measured, and the measured pressure loss was defined as "initial pressure loss (kPa)". Next, the pressure loss was measured while depositing predetermined amounts of soot and ash on the partition wall of the plugged honeycomb structure, and the measured pressure loss was defined as "pressure loss with soot (kPa)". At the time of measuring pressure loss with soot, the deposition amount of soot was 6 g/L and the deposition amount of ash was 30 g/L. Here, the deposition amount of soot and ash is the deposition amount (g) of soot or ash per unit volume (1L) of the honeycomb structure body. Then, a value obtained by subtracting "initial pressure loss (kPa)" from "pressure loss with soot (kPa)" was defined as "Increase in Pressure loss ΔP (kPa

TABLE 1

Figure 16:
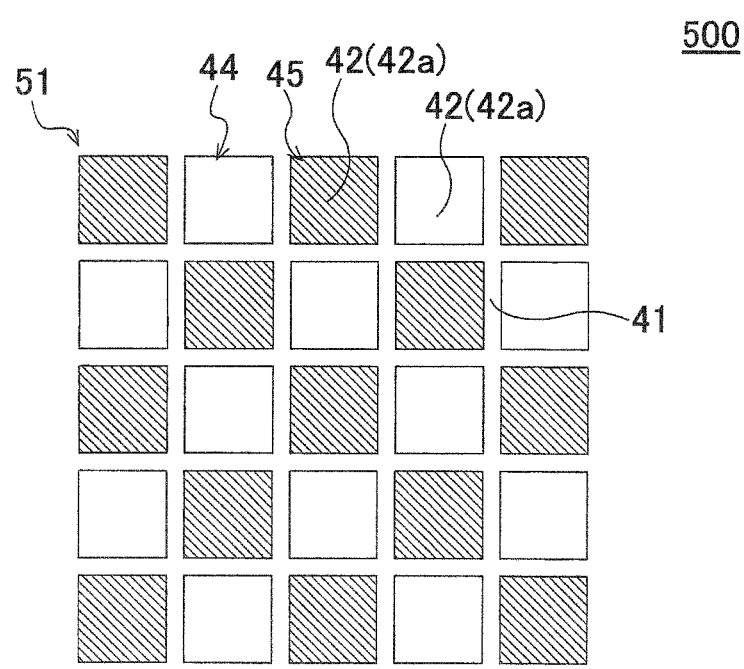
FIG. 16 is an enlarged plan view in which a portion of the inflow end face of the plugged honeycomb structure of Comparative Example 1 is enlarged.

| | Partition wall Thickness (μm) | Cell density (cells/cm²) | Cell shape | Total open porosity for all cells (%) | Total open porosity for inflow cells (%) | Total open porosity for outflow cells (%) | Cell number ratio (Na/Nb) | Reference drawing |
|---|---|---|---|---|---|---|---|---|
| Comparative Example 1 | 305 | 46.5 | Square | 63% | 32% | 32% | 1 | FIG. 16 |
| Comparative Example 2 | 152 | 46.5 | Square, Octagonal | 81% | 49% | 32% | 1 | FIG. 10 |
| Comparative Example 3 | 203 | 46.5 | Square, Octagonal | 75% | 45% | 30% | 2 | FIG. 10 |
| Comparative Example 4 | 203 | 46.5 | Square, Octagonal | 75% | 45% | 30% | 1 | FIG. 10 |
| Comparative Example 5 | 254 | 46.5 | Square, Octagonal | 69% | 42% | 27% | 1 | FIG. 10 |
| Comparative Example 6 | 305 | 46.5 | Square, Octagonal | 64% | 39% | 25% | 1 | FIG. 10 |
| Example 1 | 152 | 46.5 | Square, Octagonal | 81% | 49% | 32% | 1 | FIG. 10 |
| Example 2 | 203 | 46.5 | Square, Octagonal | 75% | 45% | 30% | 1 | FIG. 10 |
| Example 3 | 254 | 46.5 | Square, Octagonal | 69% | 42% | 27% | 1 | FIG. 10 |
| Comparative Example 7 | 305 | 46.5 | Square, Octagonal | 64% | 39% | 25% | 1 | FIG. 10 |
| Example 4 | 152 | 46.5 | Square, Octagonal | 81% | 49% | 32% | 1 | FIG. 10 |
| Example 5 | 203 | 46.5 | Square, Octagonal | 75% | 45% | 30% | 1 | FIG. 10 |
| Example 6 | 254 | 46.5 | Square, Octagonal | 69% | 42% | 27% | 1 | FIG. 10 |
| Comparative Example 8 | 305 | 46.5 | Square, Octagonal | 64% | 39% | 25% | 1 | FIG. 10 |

TABLE 2

|  | Material | Air-permeability resistance of Partition wall (Pas/m²) | Porosity (%) | Average Pore Diameter (μm) | Geometric Surface Area (GSA) of inflow cell (mm²/mm³) | Increase in Pressure loss ΔP (Soot 6 g/l, Ash 30 g/l) (kPa) |
|---|---|---|---|---|---|---|
| Comparative Example 1 | SiC | 4.70E+07 | 35 | 7 | 1.08 | 23.3 |
| Comparative Example 2 | SiC | 4.7E+07 | 35 | 7 | 1.30 | 15.0 |
| Comparative Example 3 | SiC | 5.0E+07 | 32 | 7 | 1.26 | 16.8 |
| Comparative Example 4 | SiC | 4.7E+07 | 35 | 7 | 1.26 | 16.8 |
| Comparative Example 5 | SiC | 4.7E+07 | 35 | 7 | 1.22 | 18.9 |
| Comparative Example 6 | SiC | 4.7E+07 | 35 | 7 | 1.18 | 21.5 |
| Example 1 | SiC | 4.5E+07 | 38 | 8 | 1.30 | 14.9 |
| Example 2 | SiC | 4.5E+07 | 38 | 8 | 1.26 | 16.7 |
| Example 3 | SiC | 4.5E+07 | 38 | 8 | 1.22 | 18.7 |
| Comparative Example 7 | SiC | 4.5E+07 | 38 | 8 | 1.18 | 21.3 |
| Example 4 | SiC | 4.0E+07 | 41 | 9 | 1.30 | 14.5 |
| Example 5 | SiC | 4.0E+07 | 41 | 9 | 1.26 | 16.3 |
| Example 6 | SiC | 4.0E+07 | 41 | 9 | 1.22 | 18.4 |
| Comparative Example 8 | SiC | 4.0E+07 | 41 | 9 | 1.18 | 20.8 |

Examples 2 to 40, Comparative Examples 1 to 22

The plugged honeycomb structure was prepared in the same manner as in Example 1, except that the configurations of the plugged honeycomb structure were changed as shown in Tables 1 to 10. For the plugged honeycomb structures of Example 2 to 40 and Comparative Examples 1 to 22, "Air-permeability resistance of Partition wall" were measured in the same manner as in Example 1. The plugged honeycomb structure of Examples 2 to 40 and Comparative Examples 1 to 22 were evaluated for "Increase in Pressure loss ΔP" in the same manner as in Example 1. The results are shown in Tables 2, 4, 6, 8, and 10.

The plugged honeycomb structure of Comparative Example 1 had a cell structure as shown in FIG. 16. FIG. 16 is an enlarged plan view in which a part of an inflow end face of the plugged honeycomb structure of Comparative Example 1 was enlarged. As shown in FIG. 16, in the plugged honeycomb structure 500 of Comparative Example 1, the shape of the cell 42 was quadrangular in the section of the honeycomb structure body 44. In the plugged honeycomb structure 500 of Comparative Example 1, the inflow cells 42a and the outflow cells 42b were alternately arranged with the porous partition wall 41 interposed therebetween in the section of the honeycomb structure body 44. Therefore, the plugged honeycomb structure 500 of Comparative Example 1 did not have a cell structure in which one inflow cell 42a and another inflow cell 42a are adjacent to each other with partition wall 41 interposed therebetween. In FIG. 16, reference numeral 45 denotes a plugging portion, and reference numeral 51 denotes an inflow end face.

Figure 17:
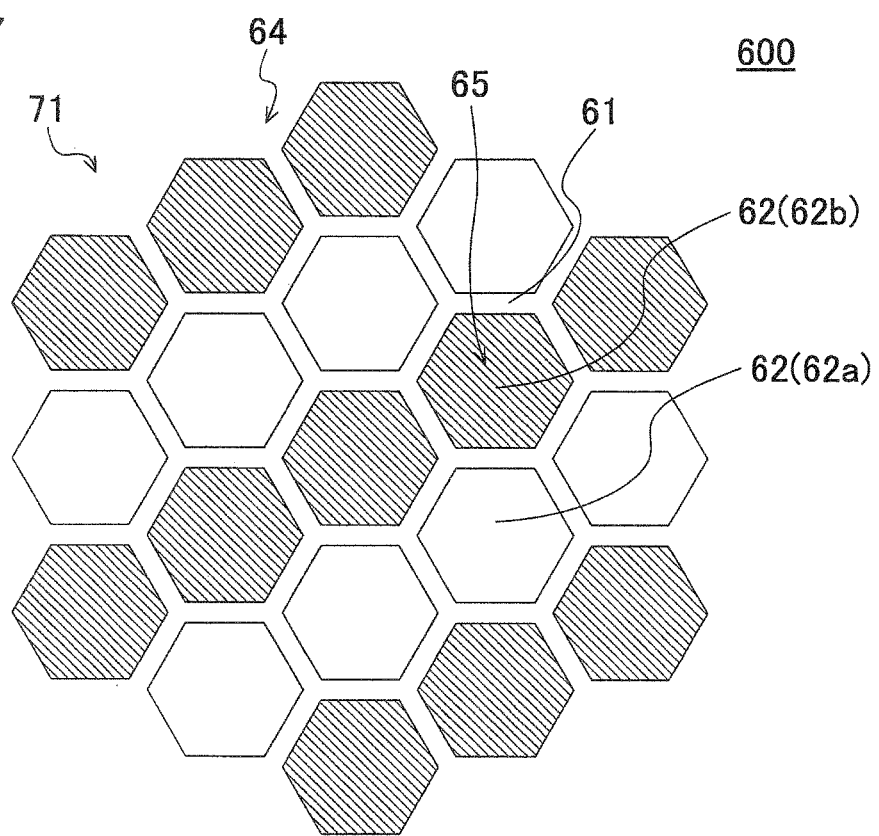
FIG. 17 is an enlarged plan view in which a portion of the inflow end face of the plugged honeycomb structure of Comparative Example 16 is enlarged.

The honeycomb structure of Comparative Example 16 had a cell structure as shown in FIG. 17. FIG. 17 is an enlarged plan view in which a part of the inflow end face of the plugged honeycomb structure of Comparative Example 16 is enlarged. As shown in FIG. 17, in the plugged honeycomb structure 600 of Comparative Example 16, the shape pf the cell 62 was hexagonal in the section of the honeycomb structure body 64. In addition, in the plugged honeycomb structure 600 of Comparative Example 16, among the six sides constituting the hexagonal cell 62, all the cells 62 arranged in a direction (one direction) orthogonal to the two sides disposed opposite were referred to as inflow cells 62a, and all the cells 62 arranged adjacent to the inflow cells 62a arranged in one direction was referred to as outflow cells 62b. In addition, all the cells 62 arranged adjacent to the outflow cells 62b were referred to as inflow cells 62a. The plugged honeycomb structure 600 of Comparative Example 16 have cell structure in which one inflow cell 62a and another inflow cell 62a are adjacent to each other with partition wall 61 interposed therebetween, however, the total area of the inflow cell 62a was the same as the total area of the outflow cell 62b. In FIG. 17, reference numeral 65 denotes a plugging portion, and reference numeral 71 denotes an inflow end face.

In Examples 29 to 32, 37 to 40 and Comparative Examples 20, 22, a honeycomb structure body of cordierite was produced by preparing the following kneaded material as a kneaded material for producing the honeycomb structure body. As a raw material for preparing kneaded material, a mixed powder of cordierite, mullite, alumina, spinel and the like was prepared. To the mixed powder, a binder, pore former, and water were added to form a forming raw material Next, the forming raw material was kneaded to prepare a round pillar-shaped kneaded material. When a honeycomb structure body is produced from kneaded material prepared using materials as described above, it is described as "Cd" in the column of "Material" in Table 8.

TABLE 3

| | Partition wall Thickness (μm) | Cell density (cells/cm²) | Cell shape | Total open porosity for all cells (%) | Total open porosity for inflow cells (%) | Total open porosity for outflow cells (%) | Cell number ratio (Na/Nb) | Reference drawing |
|---|---|---|---|---|---|---|---|---|
| Comparative Example 9 | 152 | 46.5 | Hexagonal | 77% | 51% | 26% | 2 | FIG. 3 |
| Comparative Example 10 | 178 | 46.5 | Hexagonal | 74% | 49% | 25% | 2 | FIG. 3 |
| Comparative Example 11 | 203 | 46.5 | Hexagonal | 71% | 48% | 24% | 2 | FIG. 3 |
| Comparative Example 12 | 254 | 46.5 | Hexagonal | 66% | 44% | 22% | 2 | FIG. 3 |
| Comparative Example 13 | 279 | 46.5 | Hexagonal | 64% | 43% | 21% | 2 | FIG. 3 |
| Comparative Example 14 | 305 | 46.5 | Hexagonal | 61% | 41% | 20% | 2 | FIG. 3 |
| Example 7 | 152 | 46.5 | Hexagonal | 77% | 51% | 26% | 2 | FIG. 3 |
| Example 8 | 178 | 46.5 | Hexagonal | 74% | 49% | 25% | 2 | FIG. 3 |
| Example 9 | 203 | 46.5 | Hexagonal | 71% | 48% | 24% | 2 | FIG. 3 |
| Example 10 | 254 | 46.5 | Hexagonal | 66% | 44% | 22% | 2 | FIG. 3 |
| Comparative Example 15 | 305 | 46.5 | Hexagonal | 61% | 41% | 20% | 2 | FIG. 3 |
| Comparative Example 16 | 203 | 46.5 | Hexagonal | 71% | 35% | 35% | 1 | FIG. 17 |
| Example 11 | 203 | 31.0 | Square, Octagonal | 79% | 46% | 33% | 1 | FIG. 10. |
| Example 12 | 203 | 31.0 | Hexagonal | 75% | 50% | 25% | 2 | FIG. 3 |
| Example 13 | 203 | 62.0 | Square, Octagonal | 71% | 44% | 27% | 1 | FIG. 10 |
| Example 14 | 203 | 62.0 | Hexagonal | 68% | 45% | 23% | 2 | FIG. 3 |
| Example 15 | 203 | 46.5 | Hexagonal | 71% | 53% | 18% | 3 | FIG. 7 |

TABLE 4

| | Material | Air-permeability resistance of Partition wall (Pas/m²) | Porosity (%) | Average Pore Diameter (μm) | Geometric Surface Area (GSA) of inflow cell (mm²/mm³) | Increase in Pressure loss ΔP (Soot 6 g/l, Ash 30 g/l) (kPa) |
|---|---|---|---|---|---|---|
| Comparative Example 9 | SiC | 4.7E+07 | 35 | 7 | 1.35 | 16.4 |
| Comparative Example 10 | SiC | 4.7E+07 | 35 | 7 | 1.33 | 16.2 |
| Comparative Example 11 | SiC | 4.7E+07 | 35 | 7 | 1.30 | 16.6 |
| Comparative Example 12 | SiC | 4.7E+07 | 35 | 7 | 1.25 | 18.1 |
| Comparative Example 13 | SiC | 4.7E+07 | 35 | 7 | 1.23 | 19.1 |
| Comparative Example 14 | SiC | 4.7E+07 | 35 | 7 | 1.21 | 20.2 |
| Example 7 | SiC | 4.0E+07 | 41 | 9 | 1.35 | 16.0 |
| Example 8 | SiC | 4.0E+07 | 41 | 9 | 1.33 | 15.9 |
| Example 9 | SiC | 4.0E+07 | 41 | 9 | 1.30 | 16.3 |
| Example 10 | SiC | 4.0E+07 | 41 | 9 | 1.25 | 17.9 |
| Comparative Example 15 | SiC | 4.0E+07 | 41 | 9 | 1.21 | 20.0 |
| Comparative Example 16 | SiC | 4.0E+07 | 41 | 9 | 1.30 | 18.1 |
| Example 11 | SiC | 4.0E+07 | 41 | 9 | 1.04 | 20.0 |
| Example 12 | SiC | 4.0E+07 | 41 | 9 | 1.10 | 19.8 |
| Example 13 | SiC | 4.0E+07 | 41 | 9 | 1.44 | 16.3 |
| Example 14 | SiC | 4.0E+07 | 41 | 9 | 1.47 | 15.7 |
| Example 15 | SiC | 4.0E+07 | 41 | 9 | 1.30 | 17.2 |

TABLE 5

| | Partition wall Thickness (μm) | Cell density (cells/cm²) | Cell shape | Total open porosity for all cells (%) | Total open porosity for inflow cells (%) | Total open porosity for outflow cells (%) | Cell number ratio (Na/Nb) | Reference drawing |
|---|---|---|---|---|---|---|---|---|
| Example 16 | 152 | 46.5 | Hexagonal | 77% | 51% | 26% | 2 | FIG. 3 |
| Example 17 | 178 | 46.5 | Hexagonal | 74% | 49% | 25% | 2 | FIG. 3 |
| Example 18 | 203 | 46.5 | Hexagonal | 71% | 48% | 24% | 2 | FIG. 3 |
| Example 19 | 254 | 46.5 | Hexagonal | 66% | 44% | 22% | 2 | FIG. 3 |

TABLE 5-continued

|  | Partition wall Thickness (μm) | Cell density (cells/cm²) | Cell shape | Total open porosity for all cells (%) | Total open porosity for inflow cells (%) | Total open porosity for outflow cells (%) | Cell number ratio (Na/Nb) | Reference drawing |
|---|---|---|---|---|---|---|---|---|
| Example 20 | 279 | 46.5 | Hexagonal | 64% | 43% | 21% | 2 | FIG. 3 |
| Comparative Example 17 | 305 | 46.5 | Hexagonal | 61% | 41% | 20% | 2 | FIG. 3 |
| Example 21 | 152 | 46.5 | Hexagonal | 77% | 51% | 26% | 2 | FIG. 3 |
| Example 22 | 178 | 46.5 | Hexagonal | 74% | 48% | 24% | 2 | FIG. 3 |
| Example 23 | 203 | 46.5 | Hexagonal | 71% | 44% | 22% | 2 | FIG. 3 |
| Example 24 | 254 | 46.5 | Hexagonal | 66% | 43% | 21% | 2 | FIG. 3 |
| Comparative Example 18 | 305 | 46.5 | Hexagonal | 61% | 41% | 20% | 2 | FIG. 3 |
| Example 25 | 152 | 46.5 | Hexagonal | 77% | 51% | 26% | 2 | FIG. 3 |
| Example 26 | 178 | 46.5 | Hexagonal | 74% | 48% | 24% | 2 | FIG. 3 |
| Example 27 | 203 | 46.5 | Hexagonal | 71% | 44% | 22% | 2 | FIG. 3 |
| Example 28 | 254 | 46.5 | Hexagonal | 66% | 43% | 21% | 2 | FIG. 3 |
| Comparative Example 19 | 305 | 46.5 | Hexagonal | 61% | 41% | 20% | 2 | FIG. 3 |

TABLE 6

|  | Material | Air-permeability resistance of Partition wall (Pas/m²) | Porosity (%) | Average Pore Diameter (μm) | Geometric Surface Area (GSA) of inflow cell (mm²/mm³) | Increase in Pressure loss ΔP (Soot 6 g/l, Ash 30 g/l) (kPa) |
|---|---|---|---|---|---|---|
| Example 16 | SiC | 2.8E+07 | 41 | 11 | 1.35 | 14.9 |
| Example 17 | SiC | 2.8E+07 | 41 | 11 | 1.33 | 14.9 |
| Example 18 | SiC | 2.8E+07 | 41 | 11 | 1.30 | 15.2 |
| Example 19 | SiC | 2.8E+07 | 41 | 11 | 1.25 | 16.8 |
| Example 20 | SiC | 2.8E+07 | 41 | 11 | 1.23 | 17.7 |
| Comparative Example 17 | SiC | 2.8E+07 | 41 | 11 | 1.21 | 18.8 |
| Example 21 | SiC | 1.4E+07 | 41 | 14 | 1.35 | 13.4 |
| Example 22 | SiC | 1.4E+07 | 41 | 14 | 1.33 | 13.5 |
| Example 23 | SiC | 1.4E+07 | 41 | 14 | 1.30 | 14.0 |
| Example 24 | SiC | 1.4E+07 | 41 | 14 | 1.25 | 15.5 |
| Comparative Example 18 | SiC | 1.4E+07 | 41 | 14 | 1.21 | 17.4 |
| Example 25 | SiC | 6.9E+06 | 48 | 13 | 1.35 | 12.5 |
| Example 26 | SiC | 6.9E+06 | 48 | 13 | 1.33 | 12.7 |
| Example 27 | SiC | 6.9E+06 | 48 | 13 | 1.30 | 13.2 |
| Example 28 | SiC | 6.9E+06 | 48 | 13 | 1.25 | 14.8 |
| Comparative Example 19 | SiC | 6.9E+06 | 48 | 13 | 1.21 | 16.7 |

TABLE 7

|  | Partition wall Thickness (μm) | Cell density (cells/cm²) | Cell shape | Total open porosity for all cells (%) | Total open porosity for inflow cells (%) | Total open porosity for outflow cells (%) | Cell number ratio (Na/Nb) | Reference drawing |
|---|---|---|---|---|---|---|---|---|
| Example 29 | 152 | 46.5 | Hexagonal | 77% | 51% | 26% | 2 | FIG. 3 |
| Example 30 | 178 | 46.5 | Hexagonal | 74% | 48% | 24% | 2 | FIG. 3 |
| Example 31 | 203 | 46.5 | Hexagonal | 71% | 44% | 22% | 2 | FIG. 3 |
| Example 32 | 254 | 46.5 | Hexagonal | 66% | 43% | 21% | 2 | FIG. 3 |
| Comparative Example 20 | 305 | 46.5 | Hexagonal | 61% | 41% | 20% | 2 | FIG. 3 |
| Example 33 | 152 | 46.5 | Hexagonal | 77% | 51% | 26% | 2 | FIG. 3 |
| Example 34 | 178 | 46.5 | Hexagonal | 74% | 48% | 24% | 2 | FIG. 3 |
| Example 35 | 203 | 46.5 | Hexagonal | 71% | 44% | 22% | 2 | FIG. 3 |
| Example 36 | 254 | 46.5 | Hexagonal | 66% | 43% | 21% | 2 | FIG. 3 |
| Comparative Example 21 | 305 | 46.5 | Hexagonal | 61% | 41% | 20% | 2 | FIG. 3 |
| Example 37 | 152 | 46.5 | Hexagonal | 77% | 51% | 26% | 2 | FIG. 3 |
| Example 38 | 178 | 46.5 | Hexagonal | 74% | 48% | 24% | 2 | FIG. 3 |
| Example 39 | 203 | 46.5 | Hexagonal | 71% | 44% | 22% | 2 | FIG. 3 |
| Example 40 | 254 | 46.5 | Hexagonal | 66% | 43% | 21% | 2 | FIG. 3 |
| Comparative Example 22 | 305 | 46.5 | Hexagonal | 61% | 41% | 20% | 2 | FIG. 3 |

TABLE 8

| | Material | Air-permeability resistance of Partition wall (Pas/m$^2$) | Porosity (%) | Average Pore Diameter (μm) | Geometric Surface Area (GSA) of inflow cell (mm$^2$/mm$^3$) | Increase in Pressure loss ΔP (Soot 6 g/l, Ash 30 g/l) (kPa) |
|---|---|---|---|---|---|---|
| Example 29 | Cd | 4.3E+06 | 52 | 20 | 1.35 | 11.6 |
| Example 30 | Cd | 4.3E+06 | 52 | 20 | 1.33 | 12.1 |
| Example 31 | Cd | 4.3E+06 | 52 | 20 | 1.30 | 12.6 |
| Example 32 | Cd | 4.3E+06 | 52 | 20 | 1.25 | 14.3 |
| Comparative Example 20 | Cd | 4.3E+06 | 52 | 20 | 1.21 | 16.2 |
| Example 33 | SiC | 3.6E+06 | 63 | 20 | 1.35 | 11.0 |
| Example 34 | SiC | 3.6E+06 | 63 | 20 | 1.33 | 11.4 |
| Example 35 | SiC | 3.6E+06 | 63 | 20 | 1.30 | 12.1 |
| Example 36 | SiC | 3.6E+06 | 63 | 20 | 1.25 | 13.5 |
| Comparative Example 21 | SiC | 3.6E+06 | 63 | 20 | 1.21 | 15.4 |
| Example 37 | Cd | 3.3E+06 | 65 | 20 | 1.35 | 11.3 |
| Example 38 | Cd | 3.3E+06 | 65 | 20 | 1.33 | 11.8 |
| Example 39 | Cd | 3.3E+06 | 65 | 20 | 1.30 | 12.4 |
| Example 40 | Cd | 3.3E+06 | 65 | 20 | 1.25 | 13.9 |
| Comparative Example 22 | Cd | 3.3E+06 | 65 | 20 | 1.21 | 15.8 |

TABLE 9

| | Partition wall Thickness (μm) | Cell density (cells/cm$^2$) | Cell shape | Total open porosity for all cells (%) | Total open porosity for inflow cells (%) | Total open porosity for outflow cells (%) | Cell number ratio (Na/Nb) | Reference drawing |
|---|---|---|---|---|---|---|---|---|
| Comparative Example 23 | 203 | 46.5 | Hexagonal | 71% | 48% | 24% | 2 | FIG. 3 |
| Comparative Example 11 | 203 | 46.5 | Hexagonal | 71% | 48% | 24% | 2 | FIG. 3 |
| Example 9 | 203 | 46.5 | Hexagonal | 71% | 48% | 24% | 2 | FIG. 3 |
| Example 18 | 203 | 46.5 | Hexagonal | 71% | 48% | 24% | 2 | FIG. 3 |
| Example 23 | 203 | 46.5 | Hexagonal | 71% | 44% | 22% | 2 | FIG. 3 |
| Example 27 | 203 | 46.5 | Hexagonal | 71% | 44% | 22% | 2 | FIG. 3 |
| Example 31 | 203 | 46.5 | Hexagonal | 71% | 44% | 22% | 2 | FIG. 3 |
| Example 35 | 203 | 46.5 | Hexagonal | 71% | 44% | 22% | 2 | FIG. 3 |
| Example 39 | 203 | 46.5 | Hexagonal | 71% | 44% | 22% | 2 | FIG. 3 |

TABLE 10

| | Material | Air-permeability resistance of Partition wall (Pas/m$^2$) | Porosity (%) | Average Pore Diameter (μm) | Geometric Surface Area (GSA) of inflow cell (mm$^2$/mm$^3$) | Increase in Pressure loss ΔP (Soot 6 g/l, Ash 30 g/l) (kPa) |
|---|---|---|---|---|---|---|
| Comparative Example 23 | SiC | 5.0E+07 | 32 | 7 | 1.30 | 16.7 |
| Comparative Example 11 | SiC | 4.7E+07 | 35 | 7 | 1.30 | 16.6 |
| Example 9 | SiC | 4.0E+07 | 41 | 9 | 1.30 | 16.3 |
| Example 18 | SiC | 2.8E+07 | 41 | 11 | 1.30 | 15.2 |
| Example 23 | SiC | 1.4E+07 | 41 | 14 | 1.30 | 14.0 |
| Example 27 | SiC | 6.9E+06 | 48 | 13 | 1.30 | 13.2 |
| Example 31 | Cd | 4.3E+06 | 52 | 20 | 1.30 | 12.6 |
| Example 35 | SiC | 3.6E+06 | 63 | 20 | 1.30 | 12.1 |
| Example 39 | Cd | 3.3E+06 | 65 | 20 | 1.30 | 12.4 |

(Results)

The increase in pressure loss ΔP of the plugged honeycomb structures of Examples 1 to 3 was smaller than that of the plugged honeycomb structure of Comparative Example 1. In addition, the increase in pressure loss ΔP of the plugged honeycomb structures of Example 1 to 3 was also smaller than that of the plugged honeycomb structure of Comparative Example 16 in which the total open frontal area (in other words, the total area) of the inflow cell and the outflow cell had the same values. As described above, in the plugged honeycomb structures of Example 1 to 3 having a cell structure in which one inflow cell and another inflow cell are adjacent to each other with the partition wall interposed therebetween, and constituting so that the total area of the inflow cell is larger than the total area of the outflow cell, the increase in pressure loss ΔP was smaller.

In addition, the increase in pressure loss ΔP of the plugged honeycomb structures of Example 1 to 3 was smaller than that of the plugged honeycomb structure of Comparative Example 7 of the same porosity. In addition, the increase in pressure loss ΔP of each plugged honeycomb structure of Example 1 to 3 was also smaller than that of each plugged honeycomb structure of Comparative Examples 2 to 5 having the same partition wall thickness.

The increase in pressure loss ΔP of the plugged honeycomb structure of Examples 4 to 40 was smaller than that of each plugged honeycomb structure of Comparative Examples to be compared as in the case of Examples 1 to 3.

Figure 18:
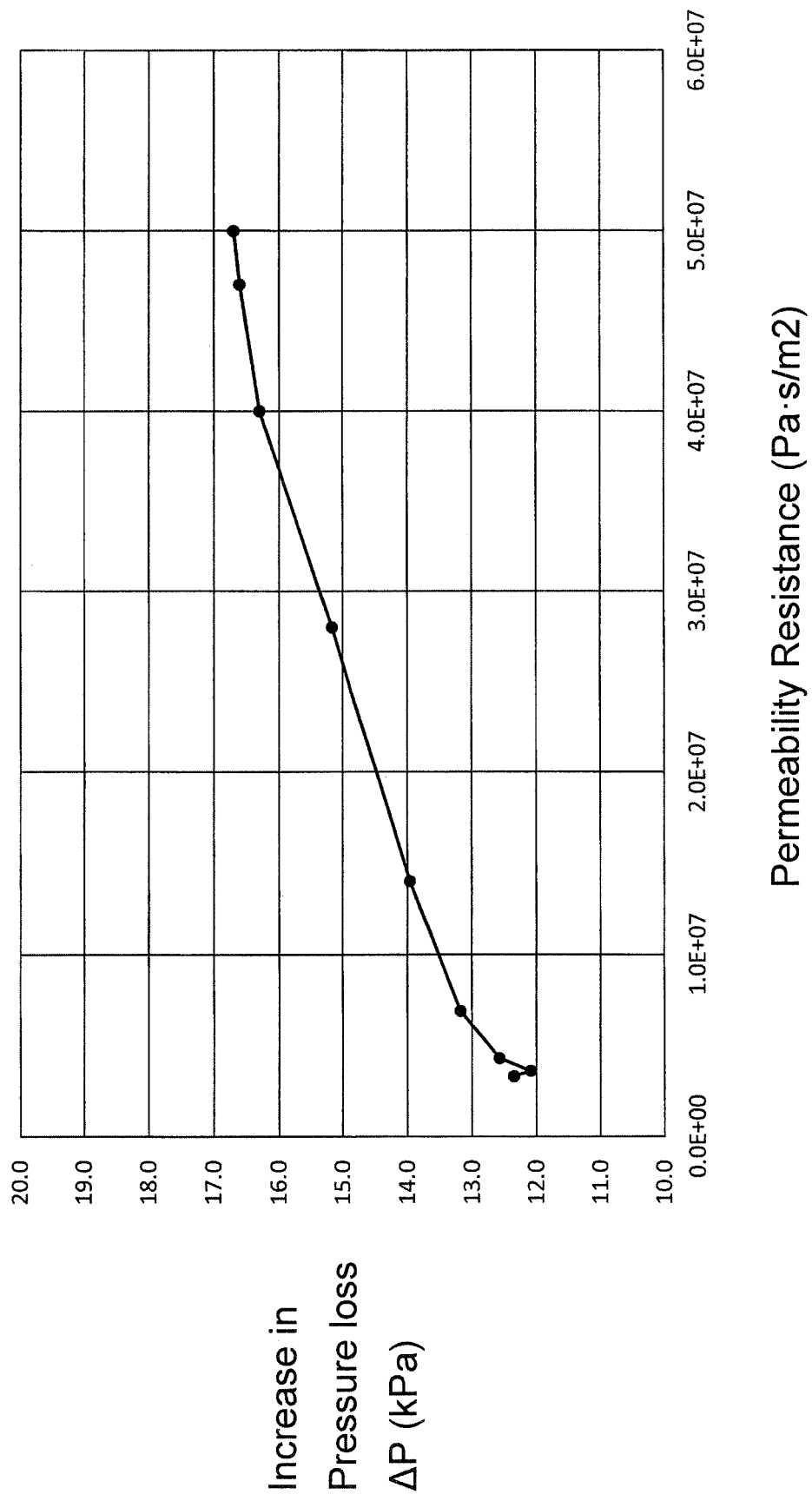
FIG. 18 is a graph showing the relationship between the permeability resistance (Pa·s/m$^2$) and pressure loss increase $\Delta P$ (kPa) in Examples and Comparative Examples.

In order to compare the effects of the permeability resistance (Pa·s/m$^2$) under the condition that the thickness of partition wall is the same, Examples and Comparative examples having a partition wall thickness of 203 μm were extracted, and the results are shown in Tables 9 and 10. In Tables 9 and 10, the results of Examples 9, 18, 23, 27, 31, 35, and 39 and Comparative Examples 11 and 23 are shown. FIG. 18 is a ph showing the relationship between "Air-permeability resistance of Partition wall (Pa·s/m$^2$)" and "Increase in Pressure loss ΔP (kPa)" in Table 10. FIG. 18 is a graph showing the relationships between the permeability resistance (Pa·s/m$^2$) and the increase in pressure loss ΔP (kPa) in Examples and Comparative Examples. In FIG. 18, the horizontal axis represents the "permeability resistance (Pa·s/m$^2$)" and the vertical axis represents the " increase in pressure loss ΔP(kPa)". As shown in Table 10 and FIG. 18, it was found that, in the range of the air-permeability resistance of the partition wall of 4.5×10$^7$Pa·s/m$^2$ or less, the change rate of the increase in pressure loss ΔP(kPa) was large and the plugged honeycomb structures of Examples 9, 18, 23, 27, 31, 35, and 39 is more expected to be suppressed the increase in pressure loss ΔP.

INDUSTRIAL APPLICABILITY

The plugged honeycomb structure of the present invention can be used as a filter for purifying exhaust gas.

DESCRIPTION OF REFERENCE NUMERALS

1, 21, 41, 61, 81: partition wall, 2, 22, 42, 62, 82: cell, 2a, 22a, 42a, 62a, 82a: inflow cell, 2b, 22b, 42b, 62b, 82b: outflow cell, 3, 83: circumferential wall, 4, 24, 44, 64, 84: honeycomb structure body, 5, 25, 45, 65, 85: plugging portion, 11, 31, 51, 71, 91: inflow end face, 12, 32, 92: outflow end face, 86: honeycomb segment, 87: bonding layer, 88: segment outer wall, 100, 200, 300, 400, 500, 600, 700: plugged honeycomb structure, T, T1, T2: Thickness of partition wall.

What is claimed is:

1. A plugged honeycomb structure comprising: a honeycomb structure body having a porous partition wall disposed so as to surround a plurality of cells serving as a fluid through channel extending from an inflow end face to an outflow end face; and a plugging portion disposed so as to plug end at any one of the inflow end face side or the outflow end face side of the cells, wherein the cells having the plugging portion at ends on the outflow end face side and that are open on the inflow end face side are inflow cells, and the cells having the plugging portion at ends on the inflow end face side and that are open on the outflow end face side are outflow cells, in a section orthogonal to the extending direction of the cell of the honeycomb structure body, the cells each have a shape that is polygon, and have a cell structure in which one of the inflow cells and another of the inflow cells are adjacent to each other with the partition wall therebetween, in the section orthogonal to the extending direction of the cell, a shape of one of the inflow cells and a shape of one of the outflow cells are congruent, and, in the section orthogonal to the extending direction of the cell, a total area of the inflow cell is larger than a total area of the outflow cell, a ratio of the total number Na of the inflow cells with respect to the total number Nb of the outflow cells is 2 or more, a total open porosity of the inflow cells is larger than a total open porosity of the outflow cells, the total open porosity of the inflow cells is 32 to 53%, and the total open porosity of the outflow cells is 18 to 35%, a porosity of the partition wall is 38% or more, a thickness of the partition wall is 125 μm or more and 280 μm or less, a cell density of the honeycomb structure body is 31.0 cells/cm$^2$ or more, and an air-permeability resistance of the partition wall is 4.5×10$^7$Pa·s/m$^2$ or less.

2. The plugged honeycomb structure of claim 1, wherein the air-permeability resistance of the partition wall is 4.0×10$^7$Pa·s/m$^2$ or less.

3. The plugged honeycomb structure according to claim 1, wherein, in the section orthogonal to the extending direction of the cell, the shape of the inflow cell is one type.

4. The plugged honeycomb structure according to claim 1, wherein, in the section orthogonal to the extending direction of the cell, the shape of the inflow cell and the shape of the outflow cell are both hexagonal.

5. The plugged honeycomb structure according to claim 1, wherein, in the section orthogonal to the extending direction of the cell, at least one of the cells has a regular hexagonal shape.

6. The plugged honeycomb structure according to claim 1, wherein the partition wall is loaded with at least one catalyst selected from the group consisting of an oxidation catalyst, a selective catalytic reduction catalyst, and a three-way catalyst.

7. The plugged honeycomb structure according to claim 6, wherein the partition wall is loaded with the oxidation catalyst and a loading amount of the oxidation catalyst is 0.1 to 30 g/L.

8. The plugged honeycomb structure according to claim 6, wherein the partition wall is loaded with the selective catalytic reduction catalyst and a loading amount of the selective catalytic reduction catalyst is 50 to 130 g/L.

9. The plugged honeycomb structure according to claim 6, wherein the selective catalytic reduction catalyst is a zeolite-type selective catalytic reduction catalyst or a vanadium-type selective catalytic reduction catalyst.

10. The plugged honeycomb structure according to claim 6, wherein the partition wall is loaded with the three-way catalyst and a loading amount of the three-way catalyst is 40 to 130 g/L.

* * * * *